United States Patent
Ichikawa et al.

(10) Patent No.: US 11,979,049 B2
(45) Date of Patent: May 7, 2024

(54) ELECTRIC WORK MACHINE

(71) Applicant: MAKITA CORPORATION, Anjo (JP)

(72) Inventors: Yoshitaka Ichikawa, Anjo (JP); Tadahiko Kobayakawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 512 days.

(21) Appl. No.: 17/274,396

(22) PCT Filed: Sep. 11, 2019

(86) PCT No.: PCT/JP2019/035739
§ 371 (c)(1),
(2) Date: Mar. 8, 2021

(87) PCT Pub. No.: WO2020/054775
PCT Pub. Date: Mar. 19, 2020

(65) Prior Publication Data
US 2022/0115892 A1    Apr. 14, 2022

(30) Foreign Application Priority Data

Sep. 14, 2018   (JP) ................................. 2018-172747

(51) Int. Cl.
*H02J 7/00*    (2006.01)
*A01D 34/68*    (2006.01)
(Continued)

(52) U.S. Cl.
CPC .......... *H02J 7/00714* (2020.01); *A01D 34/68* (2013.01); *A01D 34/78* (2013.01);
(Continued)

(58) Field of Classification Search
CPC combination set(s) only.
See application file for complete search history.

(56) References Cited

U.S. PATENT DOCUMENTS

2005/0077878 A1* 4/2005 Carrier ................ H01M 50/583
320/134
2006/0245135 A1  11/2006 Lohr
(Continued)

FOREIGN PATENT DOCUMENTS

CN    101248364 A    8/2008
CN    101416330 A    4/2009
(Continued)

OTHER PUBLICATIONS

Office Action from the Japanese Patent Office dated May 16, 2023 in related Japanese application No. 2020-546198, and machine translation thereof.

(Continued)

*Primary Examiner* — Bickey Dhakal
(74) *Attorney, Agent, or Firm* — J-TEK LAW PLLC; Jeffrey D. Tekanic; Scott T. Wakeman

(57) ABSTRACT

An electric work machine (1), such as a power tool, comprises a motor (50), a manipulatable part (12) such as a trigger switch, and a control part (36). The motor is energized with electric current supplied by a battery pack (22). By manipulating the manipulatable part, the control part energizes the motor. The control part also acquires information concerning the state of the battery from the battery pack, and, if appropriate based on the information obtained from the battery pack, takes measures (such as limiting a discharge current) to restrain, delay and possibly avert the performance of a protection (discharge-prohibited) operation by the battery pack.

25 Claims, 23 Drawing Sheets

(51) Int. Cl.
*A01D 34/78* (2006.01)
*H01M 10/48* (2006.01)
*H02K 7/14* (2006.01)
*H02K 11/33* (2016.01)

(52) U.S. Cl.
CPC ........... *H01M 10/48* (2013.01); *H02J 7/0044* (2013.01); *H02K 7/145* (2013.01); *H02K 11/33* (2016.01)

(56) References Cited

U.S. PATENT DOCUMENTS

| | | | |
|---|---|---|---|
| 2007/0128505 | A9 | 9/2007 | Yahnker et al. |
| 2009/0108806 | A1* | 4/2009 | Takano ............... H01M 10/482 320/112 |
| 2009/0153100 | A1 | 6/2009 | Okumura et al. |
| 2009/0208821 | A1 | 8/2009 | Kosugi et al. |
| 2012/0118595 | A1 | 5/2012 | Pellenc |
| 2012/0262035 | A1 | 10/2012 | Takano et al. |
| 2013/0033233 | A1 | 2/2013 | Noda et al. |
| 2015/0084554 | A1 | 3/2015 | Tsuruta et al. |
| 2015/0222205 | A1* | 8/2015 | Suda ................... H02P 29/0241 318/476 |
| 2015/0357853 | A1 | 12/2015 | Suzuki et al. |
| 2016/0028344 | A1 | 1/2016 | Kusakawa et al. |
| 2017/0033575 | A1 | 2/2017 | Kaji et al. |
| 2017/0126036 | A1* | 5/2017 | Dulle .................. H01M 10/42 |
| 2017/0194670 | A1 | 7/2017 | Kawano et al. |
| 2018/0345433 | A1 | 12/2018 | Sudo et al. |
| 2020/0127339 | A1* | 4/2020 | Nakano ............... H01M 50/269 |
| 2022/0123565 | A1 | 4/2022 | Ichikawa et al. |

FOREIGN PATENT DOCUMENTS

| | | | | |
|---|---|---|---|---|
| CN | 101604849 | A | | 12/2009 |
| CN | 102763304 | A | * | 10/2012 ........... A47L 9/2884 |
| CN | 202964597 | U | * | 6/2013 ................ B25F 5/00 |
| CN | 104467546 | A | | 3/2015 |
| CN | 104969408 | A | | 10/2015 |
| CN | 106410889 | A | | 2/2017 |
| CN | 106415915 | A | | 2/2017 |
| CN | 108290279 | A | | 7/2018 |
| DE | 102015116508 | A1 | | 3/2017 |
| EP | 2375542 | A2 | | 10/2011 |
| EP | 3150340 | B1 | | 3/2018 |
| JP | 2005131770 | A | | 5/2005 |
| JP | 2005182522 | A | | 7/2005 |
| JP | 2007520180 | A | | 7/2007 |
| JP | 2008177138 | A | | 7/2008 |
| JP | 2010158163 | A | | 7/2010 |
| JP | 2010540258 | A | | 12/2010 |
| JP | 2011201004 | A | | 10/2011 |
| JP | 2011229319 | A | | 11/2011 |
| JP | 2013066960 | A | | 4/2013 |
| JP | 2013207898 | A | | 10/2013 |
| JP | 2013239259 | A | | 11/2013 |
| JP | 2014091176 | A | | 5/2014 |
| JP | 2014148008 | A | | 8/2014 |
| JP | 2014235839 | A | | 12/2014 |
| JP | 2015196196 | A | | 11/2015 |
| JP | 2016022566 | A | | 2/2016 |
| JP | 2016103937 | A | | 6/2016 |
| JP | 2017140686 | A | | 8/2017 |
| JP | 2017159449 | A | | 9/2017 |
| JP | 2017163808 | A | | 9/2017 |
| JP | 2017174683 | A | | 9/2017 |
| KR | 20160001373 | A | | 1/2016 |
| WO | 2005038952 | A2 | | 4/2005 |
| WO | 2016136499 | A1 | | 9/2016 |
| WO | 2019031273 | A1 | | 2/2019 |
| WO | WO-2019031274 | A1 | * | 2/2019 ................ B25F 5/00 |

OTHER PUBLICATIONS

Office Action from the Japanese Patent Office dated Jun. 27, 2023 in related Japanese application No. 2020-546057, and machine translation thereof.
English translation of the International Search Report dated Nov. 19, 2019 for parent application No. PCT/JP2019/035739.
English translation of the Written Opinion of the International Searching Authority in PCT/JP2019/035739.
English translation of the International Search Report dated Oct. 29, 2019 for related application No. PCT/JP2019/035925.
English translation of the Written Opinion of the International Searching Authority dated Oct. 29, 2019 for related application No. PCT/JP2019/035925.
Supplementary European Search Report dated Apr. 22, 2022, in related EP application No. 19 860 567.7, including examined claims 1-19.
Supplementary European Search Report dated May 6, 2022, in related EP application No. 19 859 658.7, including examined claims 1-25.
Office Action from the Chinese Patent Office dated Jun. 29, 2023 in related CN application No. 201980059244.8, and machine translation thereof.
Office Action dated Jan. 5, 2024, in related U.S. Appl. No. 17/275,504.
Office Action from the Chinese Patent Office dated Jun. 29, 2023 in related CN application No. 201980059482.9, and machine translation thereof.

* cited by examiner

CHARGER-STORAGE REGION

| MODEL NO. | MOUNTED COUNT |
|---|---|
| SA | 30 TIMES |
| RA | 15 TIMES |
| EMPTY LOCATION | 0 TIMES |

FIG.12

WORK-MACHINE STORAGE REGION

| MODEL NO. | MOUNTED COUNT |
|---|---|
| TD | 30 TIMES |
| HS | 15 TIMES |
| UB | 4 TIMES |
| EMPTY LOCATION | 0 TIMES |
| EMPTY LOCATION | 0 TIMES |
| EMPTY LOCATION | 0 TIMES |
| EMPTY LOCATION | 0 TIMES |
| EMPTY LOCATION | 0 TIMES |
| EMPTY LOCATION | 0 TIMES |
| EMPTY LOCATION | 0 TIMES |
| EMPTY LOCATION | 0 TIMES |
| EMPTY LOCATION | 0 TIMES |
| EMPTY LOCATION | 0 TIMES |
| EMPTY LOCATION | 0 TIMES |
| EMPTY LOCATION | 0 TIMES |

FIG.13

ELECTRIC WORK MACHINE

CROSS-REFERENCE TO RELATED APPLICATIONS

This application is the US national phase of International patent application no. PCT/JP2019/035739 filed on Sep. 11, 2019, which claimed priority to Japanese Patent Application No. 2018-172747 filed on Sep. 14, 2018, the entirety of which is incorporated herein by reference in this patent application.

TECHNICAL FIELD

The present disclosure relates to an electric work machine.

BACKGROUND ART

An electric work machine (power tool) described in Japanese Laid-open Patent Publication 2005-131770 operates by receiving electric power from a battery pack, which has multiple battery cells connected in series. When it is determined that the voltage value of at least one of the plurality of battery cells has been lower than a threshold for a specified time, the above-mentioned battery pack outputs a discharge-prohibit signal to the electric work machine. When the discharge-prohibit signal is input from the battery pack, the above-mentioned electric work machine stops switching devices that control the electric current to the motor, thereby interrupting the supply of electric power to the motor to protect the battery pack.

SUMMARY OF THE INVENTION

There is a possibility that a battery pack will malfunction also in the situation in which a comparatively large electric current has flowed for a comparatively long time. Therefore, it is preferable that a discharge-prohibit signal is also output from the battery pack when an overcurrent state is detected, in order to protect the battery pack. Nevertheless, if the load on the work machine becomes high, the electric current that flows from the battery pack to the work machine becomes large. Consequently, there is a problem in that, if discharging is prohibited when the battery pack is in the overcurrent state, then discharging will be prohibited frequently when the load on the work machine is high, and consequently work efficiency will drop.

The present disclosure provides an electric work machine that improves user convenience while still enabling a protection function of a battery pack to operate when the battery pack should be protected.

In one aspect of the present disclosure, an electric work machine (power tool) operates by receiving a supply of electric power from a battery pack, which performs a protection operation in response to having become overloaded. The electric work machine comprises a motor, a switch, and a control part. The motor is driven by receiving electric power from the battery pack. The switch is configured such that it is manipulatable to start the motor. The control part is configured to control the drive of the motor so as to start the motor in response to the switch having been manipulated, acquire state information concerning the discharge state of the battery pack, and restrain (e.g., delay or reduce the likelihood of) the performance of the protection operation by the battery pack based on the acquired state information. In other words, by taking appropriate measures, e.g., reducing or limiting the discharge current supplied from the battery pack to the motor, the control part can postpone and possibly avert the performance of the protection operation by the battery pack because the battery pack may never reach an overcurrent or overloaded state.

The state information concerning the discharge state of the battery pack is acquired by the control part of the electric work machine described above. When the battery pack becomes overloaded, the battery pack performs the protection operation, e.g., shuts down (prohibits) the further supply of discharge current to the electric work machine. In this aspect, the control part controls the drive (energization) of the motor so as to restrain (delay and reduce the likelihood of) the performance of the protection operation by the battery pack based on the acquired state information. Thereby, work using the electric work machine can be continued while the performance of the protection operation by the battery pack is being restrained. At this time, the condition, which the battery pack monitors to determine whether to perform the protection operation, does not change. Thereby, user convenience can be enhanced while still permitting the battery pack to perform the protection operation when the battery pack requires protection (shutting down).

In addition, the control part may be configured to change, based on the state information and before the protection operation is performed by the battery pack, a control parameter of the motor concerning the supplied electric power.

If the control part changes the control parameter of the motor concerning the supplied electric power before the protection operation is performed by the battery pack, the performance of the protection operation by the battery pack can be restrained, and thereby work using the electric work machine can be continued.

In addition, the control part may be configured to change, based on the state information, the control parameter so as to limit the supplied electric power.

If the control part changes the control parameter so as to limit the supplied electric power, the electric power supplied by the battery pack is limited before the battery pack performs the protection operation. As a result, because the cumulation of the load on the battery pack is curtailed, work using the electric work machine can be continued in the state in which the protection operation is not performed by the battery pack.

In addition, the state information may include information concerning a sign or warning that the battery pack will soon perform the protection operation.

If the state information includes information concerning a sign that the protection operation will soon be performed, the control part can recognize that sign before the battery pack performs the protection operation. In turn, before the protection operation is performed by the battery pack, the control part can change the control parameter so that the protection operation is not performed, that is, so that the cumulation of load on the battery pack is curtailed.

In addition, the control parameter may include a value of a discharge current that will flow from the battery pack to the motor. The control part may limit the value of the discharge current based on the state information.

If the control part limits the discharge current, the electric power supplied by the battery pack is limited before the battery pack performs the protection operation. As a result, the user can continue work using the electric work machine in the state in which the protection operation is not performed by the battery pack, although the output of the electric work machine (motor) will decrease.

In addition, the control part may be configured to stop the motor, based on the state information, before the protection operation is performed by the battery pack.

When the battery pack performs the protection operation, the electric work machine can no longer be used for a comparatively long interval. Accordingly, if the control part stops the motor before the protection operation is performed by the battery pack, the battery pack can recover in a comparatively short time, and thereby work using the electric work machine can be resumed more quickly than if the protection operation had been performed.

In addition, the state information may include a cumulative value, which is the cumulation of addition values, each being in accordance with a value of a discharge current supplied from the battery pack to the motor, that is used by the battery pack to determine whether to perform the protection operation. The control part may be configured to control the drive (energization) of the motor using the cumulative value as a battery-protection value.

The cumulative value, which is used by the battery pack to perform the protection operation, is acquired by the control part from the battery pack. Thereby, the control part can use the acquired cumulative value to control the drive (energization) of the motor such that the performance of the protection operation by the battery pack is restrained.

In addition, the state information may include map information for calculating a cumulative value used by the battery pack to perform the protection operation. The control part may be configured to detect discharging-related values concerning discharging, calculate a battery-protection value from the detected discharging-related value and the map information, and control the drive (energization) of the motor using the calculated battery-protection value. The battery-protection value may be a value that corresponds to the cumulative value calculated by the battery pack cumulating addition values, each being in accordance with a discharging-related value in the map information.

The map information, which is for calculating the cumulative value used by the battery pack to perform the protection operation, is acquired by the control part, and the battery-protection value, which corresponds to the cumulative value, is calculated using the acquired map information. Thereby, the control part can use the calculated battery-protection value to control the drive (energization) of the motor such that the performance of the protection operation by the battery pack is restrained.

In addition, the discharging-related values may be values of the discharge current that flows from the battery pack to the electric work machine.

The battery-protection value can be calculated using the detected discharge-current values as the discharging-related values.

In addition, the state information may include the cumulative value. The control part may be configured to set the battery-protection value to the cumulative value acquired from the battery pack in response to the cumulative value having been acquired from the battery pack.

In response to the control part having acquired the cumulative value from the battery pack, the cumulative value acquired from the battery pack is taken as the battery-protection value. Accordingly, because the same value as the value used by the battery pack to determine whether to perform the protection operation is used as much as possible, the control part can detect, with good accuracy, a sign or warning that the battery pack will soon perform the protection operation.

In addition, the control part may be configured to calculate the battery-protection value by adding addition values in accordance with the discharging-related values detected in the map information, to the previous cumulative value acquired from the battery pack.

The battery-protection value is calculated by the control part adding addition values to the previous cumulative value acquired from the battery pack. Accordingly, the control part can use, as much as possible, the value used by the battery pack to determine whether to perform the protection operation. In turn, the control part can update the battery-protection value, even in an interval in which the cumulative value cannot be acquired—such as between communications or in situations in which communication is temporarily cut off—while using, as much as possible, the value used by the battery pack to determine whether to perform the protection operation. Thereby, it is possible to detect, with good accuracy, a sign or warning that the battery pack will soon perform the protection operation.

In addition, the battery pack may be configured to perform the protection operation in response to the cumulative value having exceeded a protection threshold. The control part may be configured to change the control parameter of the motor concerning the supplied electric power so as to limit the electric power supplied by the battery pack in response to the battery-protection value having exceeded a limit threshold, which is smaller than the protection threshold.

When the battery-protection value has exceeded the limit threshold, which is smaller than the protection threshold, the control parameter of the motor concerning the electric power supplied by the battery pack is changed so as to limit the supplied electric power. Thereby, an increase in the cumulative value and in the battery-protection value is curtailed. As a result, the performance of the protection operation by the battery pack is restrained, and the motor can continue to receive electric power from the battery pack.

In addition, the state information may include map information that indicates a correspondence relationship between the values of the discharge current that flows from the battery pack to the motor and the addition values. The battery pack may be configured to perform the protection operation in response to the cumulative value having exceeded the protection threshold. The control part may be configured to: detect the discharge current; estimate—from the battery-protection value, the detected discharge-current value, and the map information—the time until the battery pack will perform the protection operation; and, in response to the estimated time being shorter than a time threshold, to change the control parameter of the motor concerning the electric power supplied by the battery pack so as to limit the supplied electric power.

The time until the battery pack will perform the protection operation is estimated and, in response to the estimated time being shorter than the time threshold, the control parameter of the motor concerning the electric power supplied by the battery pack is changed so as to limit the supplied electric power. Thereby, an increase in the cumulative value and in the battery-protection value is curtailed. As a result, the performance of the protection operation by the battery pack is restrained, and thereby the motor can continue to receive electric power from the battery pack.

In addition, the battery pack may be configured to perform the protection operation in response to the cumulative value having exceeded a protection threshold. The control part may be configured to stop the motor in response to the battery-protection value having exceeded a stop threshold, which is smaller than the protection threshold.

When the battery-protection value has exceeded the stop threshold, which is smaller than the protection threshold, the motor is stopped. At this time, the cumulative value and the battery-protection value will start to decrease. As a result, the battery pack can be caused to recover in a motor-stop interval that is shorter than in the situation in which the protection operation is performed by the battery pack. In turn, the motor can resume, after a comparatively short stop interval, receiving electric power from the battery pack.

In addition, the stop threshold may include a first stop threshold and a second stop threshold. The second stop threshold is greater than the first stop threshold. The control part may be configured, after having stopped the motor in response to the battery-protection value having exceeded the first stop threshold, to restart the motor in response to the switch being manipulated. In addition, the control part may be configured, after having stopped the motor in response to the battery-protection value having exceeded the second stop threshold, to prohibit restarting of the motor until the battery-protection value falls below the first stop threshold.

In response to the battery-protection value having exceeded the first stop threshold, the motor is stopped, and subsequently the motor is restarted in response to the manipulatable part having been manipulated. Furthermore, in response to the battery-protection value having exceeded the second stop threshold, the motor is stopped, and the restarting of the motor is prohibited until the battery-protection value falls below the first stop threshold. Thereby, once the motor has stopped, the user can continue usage of the electric work machine by manipulating the manipulatable part and can recognize, by continuing the usage, that an interval in which the electric work machine can not be used is approaching.

In addition, the state information may include map information that indicates a correspondence relationship between the values of the discharge current that flows from the battery pack to the motor and the addition values. The control part may be configured to detect the discharge-current values and to set the limit threshold based on the detected discharge-current values and the acquired map information.

If the state information includes such map information, the control part can change the limit threshold in accordance with the values of the discharge current. In turn, the control part can suitably limit the electric power supplied by the battery pack in accordance with the values of the discharge current.

In addition, the state information may include the battery temperature of the battery pack and map information differentiated by battery temperature. The control part may set the limit threshold based on the detected discharge-current value, the acquired battery temperature, and the acquired map information.

If the state information includes such map information differentiated by battery temperature, the control part can change the limit threshold in accordance with the battery temperature and the value of the discharge current. In turn, the control part can more suitably limit the electric power supplied by the battery pack.

In addition, the state information may include a remaining capacity (remaining charge) of the battery pack. The battery pack may perform the protection operation in response to the remaining capacity having fallen below a first capacity threshold. The control part may be configured to change the control parameter of the motor concerning the electric power supplied by the battery pack so as to limit the supplied electric power in response to the remaining capacity having fallen below a second capacity threshold, which is greater than the first capacity threshold.

When the remaining capacity of the battery pack falls below the second capacity threshold, which is greater than the first capacity threshold, the control parameter of the motor concerning the supplied electric power is changed. Thereby, the rate of decrease of the remaining capacity of the battery pack becomes slower. As a result, the performance of the protection operation by the battery pack is restrained, and the motor can continue to receive the electric power supplied from the battery pack.

In addition, the state information may include a battery temperature of the battery pack. The battery pack may perform the protection operation in response to the battery temperature having exceeded a first temperature threshold. The control part may change the control parameter concerning the electric power supplied by the battery pack so as to limit the supplied electric power in response to the battery temperature having exceeded a second temperature threshold, which is lower than the first temperature threshold.

When the battery temperature has exceeded the second temperature threshold, which is lower than the first temperature threshold, the control parameter of the motor concerning the supplied electric power is changed. Thereby, the temperature rise of the battery pack is curtailed. As a result, the performance of the protection operation by the battery pack is restrained, and the motor can continue to receive the electric power supplied from the battery pack.

In addition, the control part may perform pulse-width modulation (PWM) control of the motor. The control parameter may include a duty ratio for use in the PWM control.

By changing the duty ratio in the PWM control, the value of the electric current that flows to the motor changes, and thereby the electric power supplied to the motor can be changed. In turn, by reducing the duty ratio and thereby curtailing the supplied electric power, the performance of the protection operation by the battery pack can be restrained.

In addition, the control part may acquire the state information before the driving of the motor and change the control parameter based on the state information before the driving of the motor.

When the battery pack is mounted on the electric work machine, the state information is acquired by the electric work machine from the battery pack before the driving of the motor, and the control parameter is changed based on the acquired state information. Thereby, the motor can be caused to start after the control parameter has been set such that the battery pack does not perform the protection operation. In turn, it is possible to avoid the motor being stopped as a result of the battery pack performing the protection operation immediately after the motor is started.

In addition, the electric work machine described above may further comprise a main-power-supply switch for supplying the power supply to the control part. The control part may start requesting the state information from the battery pack from the point in time after the main-power-supply switch has been turned ON and before the driving of the motor.

After the main-power-supply switch has entered the ON state, communication between the electric work machine and the battery pack is started. Consequently, electric-power consumption can be curtailed more than in the situation in which communication starts merely by the battery pack having been mounted on the electric work machine. In addition, requests to the battery pack for the state information are started from a point in time before the driving of the motor. Consequently, the control parameter is changed before the driving of the motor, and therefore the motor can be caused to start within an electric-power consumption range in which the battery pack does not perform the protection operation.

In addition, the control part may acquire the state information transmitted from the battery pack by serial communication. The frequency of the serial communication when electric current is flowing from the battery pack to the motor may be higher than the frequency of the serial communication when electric current is not flowing from the battery pack to the motor.

When electric current is not flowing from the battery pack to the motor, the state of the battery pack changes significantly less than when electric current is flowing from the battery pack to the motor. Consequently, when electric current is not flowing from the battery pack to the motor, the processing load on the electric work machine can be curtailed by curtailing (reducing) the frequency of the serial communication.

In addition, the control part may set, based on the acquired state information, a current-upper-limit value for the discharge current that flows from the battery pack to the motor and may control (limit) the value of the discharge current to the set current-upper-limit value or less.

The current-upper-limit value of the discharge current is set, and the drive (energization) of the motor is controlled (limited) such that the value of the discharge current becomes the set current-upper-limit value or less. Thereby, by reducing the current-upper-limit value before the battery pack performs the protection operation, the drive of the motor can be continued within an electric-power consumption range in which the battery pack does not perform the protection operation.

The present disclosure further includes the following additional non-limiting embodiments (items).

[Item A-1]

In another aspect of the present disclosure, an electric work machine comprises the motor, an acquiring part, and the control part. The motor rotates by receiving electric power from the battery pack. The acquiring part acquires state information concerning the discharge state of the battery pack. The control part changes a control parameter of the motor concerning the electric power supplied from the battery pack to the motor based on the state information acquired by the acquiring part and before a protection function of the battery pack operates.

According to this aspect of the present disclosure, the state information concerning the discharge state of the battery pack is acquired by the electric work machine. The protection function of the battery pack operates when, for example, the battery pack enters an overcurrent state. Consequently, the electric work machine changes the control parameter of the motor concerning the amount of electric power supplied by the battery pack based on the acquired state information and before the protection function of the battery pack operates. Thereby, the electric work machine can continue to receive a reduced amount of electric power so as to restrain (delay or reduce the likelihood of the performance of) the operation of the protection function of the battery pack. In addition, because the condition, which is monitored to determine whether the protection function should be performed by the battery pack, does not change, the protection function operates when the battery pack should be protected. Thereby, user convenience can be enhanced while the protection function of the battery pack is still caused to operate when the battery pack requires protection.

[Item A-2]

The control part may change the control parameter based on the state information so as to limit the electric power supplied by the battery pack.

If the control part changes the control parameter so as to limit the amount of electric power supplied by the battery pack, the supplied electric power is limited before the protection function of the battery pack operates. As a result, the user can continue usage of the electric work machine in the state in which the protection function of the battery pack does not operate.

[Item A-3]

The state information may include information concerning a sign or warning that the protection function of the battery pack will soon operate.

If the state information includes such information concerning a sign or warning that the protection function will soon operate, the electric work machine can recognize that sign before the protection function of the battery pack operates. In turn, before the protection function of the battery pack operates, the electric work machine can change the control parameter so that the protection function does not operate.

[Item A-4]

The control parameter may include the discharge current supplied from the battery pack to the motor. The control part may limit the discharge current based on the state information.

If the control part limits the discharge current, the electric power supplied by the battery pack is limited before the protection function of the battery pack operates. As a result, the user can continue using the electric work machine in the state in which the protection function of the battery pack does not operate.

[Item A-5]

The state information may include a counter value obtained by cumulating addition values, each being in accordance with the magnitude of the discharge current supplied from the battery pack to the motor. The protection function of the battery pack may operate when the counter value has exceeded a first threshold. Furthermore, the control part may change the control parameter in the situation when the counter value has exceeded a second threshold, which is smaller than the first threshold.

When the counter value has exceeded the second threshold, which is smaller than the first threshold, the control parameter of the motor concerning the supplied electric power is changed. Thereby, an increase of the counter value is curtailed. As a result, the operation of the protection function of the battery pack is restrained, and the motor can continue to receive electric power from the battery pack.

[Item A-6]

The state information may include map information that indicates a correspondence relationship between the magnitude of the discharge current and the addition values. In such an embodiment, the control part may set the second threshold based on the detected discharge-current magnitude and the acquired map information.

If the state information includes such map information, the control part can change the second threshold in accordance with the magnitude of the discharge current. In turn, the control part can suitably limit the amount of electric power supplied by the battery pack in accordance with the magnitude of the discharge current.

[Item A-7]

The state information may include the battery temperature of the battery pack and map information differentiated by battery temperature. In such an embodiment, the control part may set the second threshold based on the detected discharge-current value, the acquired battery temperature, and the acquired map information.

If the state information includes such map information differentiated by battery temperature, the control part can change the second threshold in accordance with the battery temperature and the magnitude of the discharge current. Consequently, the control part can more suitably limit the supplied electric power.

[Item A-8]

The state information may include the remaining capacity of the battery pack. The protection function of the battery pack may operate in the situation in which the remaining capacity has fallen below a first capacity threshold. In addition, the control part may change the control parameter when the remaining capacity has fallen below a second capacity threshold, which is greater than the first capacity threshold.

When the remaining capacity of the battery pack falls below the second capacity threshold, which is greater than the first capacity threshold, the control parameter of the motor concerning the supplied electric power is changed. Thereby, the rate of decrease of the remaining capacity of the battery pack becomes slower. As a result, the operation of the protection function of the battery pack is restrained, and the motor can continue to receive the electric power supplied from the battery pack for a longer interval.

[Item A-9]

The state information may include the battery temperature of the battery pack. The protection function of the battery pack may operate in the situation in which the battery temperature has exceeded a first temperature threshold. In addition, the control part may change the control parameter in the situation in which the battery temperature has exceeded a second temperature threshold, which is lower than the first temperature threshold.

When the battery temperature has exceeded the second temperature threshold, which is smaller than the first temperature threshold, the control parameter of the motor concerning the supplied electric power is changed. Thereby, the temperature rise of the battery pack is curtailed. As a result, the operation of the protection function of the battery pack is restrained, and the motor can continue to receive the electric power supplied from the battery pack for a longer interval.

[Item A-10]

The control part may perform pulse-width modulation (PWM) control of the electric current that flows to the motor. The control parameter may include a duty ratio for use in the PWM control.

By changing the duty ratio in the PWM control, the value of the electric current that flows to the motor changes, and thereby the electric power supplied to the motor can be changed. In turn, by reducing the duty ratio and thereby curtailing the amount of electric power supplied by the battery pack, the operation of the protection function of the battery pack can be restrained.

[Item A-11]

The acquiring part may acquire the state information before the driving of the motor. The control part may change the control parameter based on the state information before the driving of the motor.

The state information is acquired starting from before the driving of the motor, and the control parameter is changed based on the acquired state information. Thereby, in the situation in which the motor is temporarily stopped and then restarted, the motor is restarted without the control parameter returning to the initial value from the value before the temporary stop. Thereby, the motor can be restarted within an electric-power consumption range in which the protection function of the battery pack does not operate.

[Item A-12]

The electric work machine may comprise the main-power-supply switch for supplying the power supply to the control part. The control part may start requesting the state information from the battery pack from the point in time after the main-power-supply switch has entered the ON state and before the driving of the motor.

After the main-power-supply switch has entered the ON state, communication between the electric work machine and the battery pack is started. Consequently, electric-power consumption can be curtailed more than in an embodiment in which communication starts merely by the battery pack having been mounted on the electric work machine. In addition, requests to the battery pack for the state information are started from a point in time before the driving of the motor. Consequently, the control parameter is changed before the driving of the motor, and therefore the drive of the motor can be caused to start within the supplied electric-power consumption range in which the protection function of the battery pack does not operate.

[Item A-13]

The acquiring part may acquire the state information transmitted from the battery pack according to a serial communication protocol. The frequency of the serial communication when electric current is flowing from the battery pack to the motor may be higher than the frequency of the serial communication when electric current is not flowing from the battery pack to the motor.

When electric current is not flowing from the battery pack to the motor, the state of the battery pack changes significantly less than when electric current is flowing from the battery pack to the motor. Consequently, when electric current is not flowing from the battery pack to the motor, the processing load on the electric work machine can be curtailed by curtailing (reducing) the frequency of the serial communication.

[Item A-14]

The electric work machine may comprise a setting part configured to set, based on the state information acquired by the acquiring part, the current-upper-limit value of the discharge current supplied from the battery pack to the motor. The control part may perform control such that the value of the discharge current becomes the current-upper-limit value set by the setting part or less.

The current-upper-limit value of the discharge current is set and control is performed such that the value of the discharge current becomes the set current-upper-limit value or less. Thereby, by reducing the current-upper-limit value before the protection function of the battery pack operates, the drive (energization) of the motor can be continued within the electric-power consumption range in which the protection function of the battery pack does not operate.

BRIEF DESCRIPTION OF THE DRAWINGS

FIG. 12 shows a storage region that stores the number of times a charger has been mounted on the battery pack according to the first embodiment.

FIG. 13 shows a storage region that stores the number of times a tool has been mounted on the battery pack according to the first embodiment.

EXPLANATION OF THE REFERENCE NUMBERS

Figure 1:
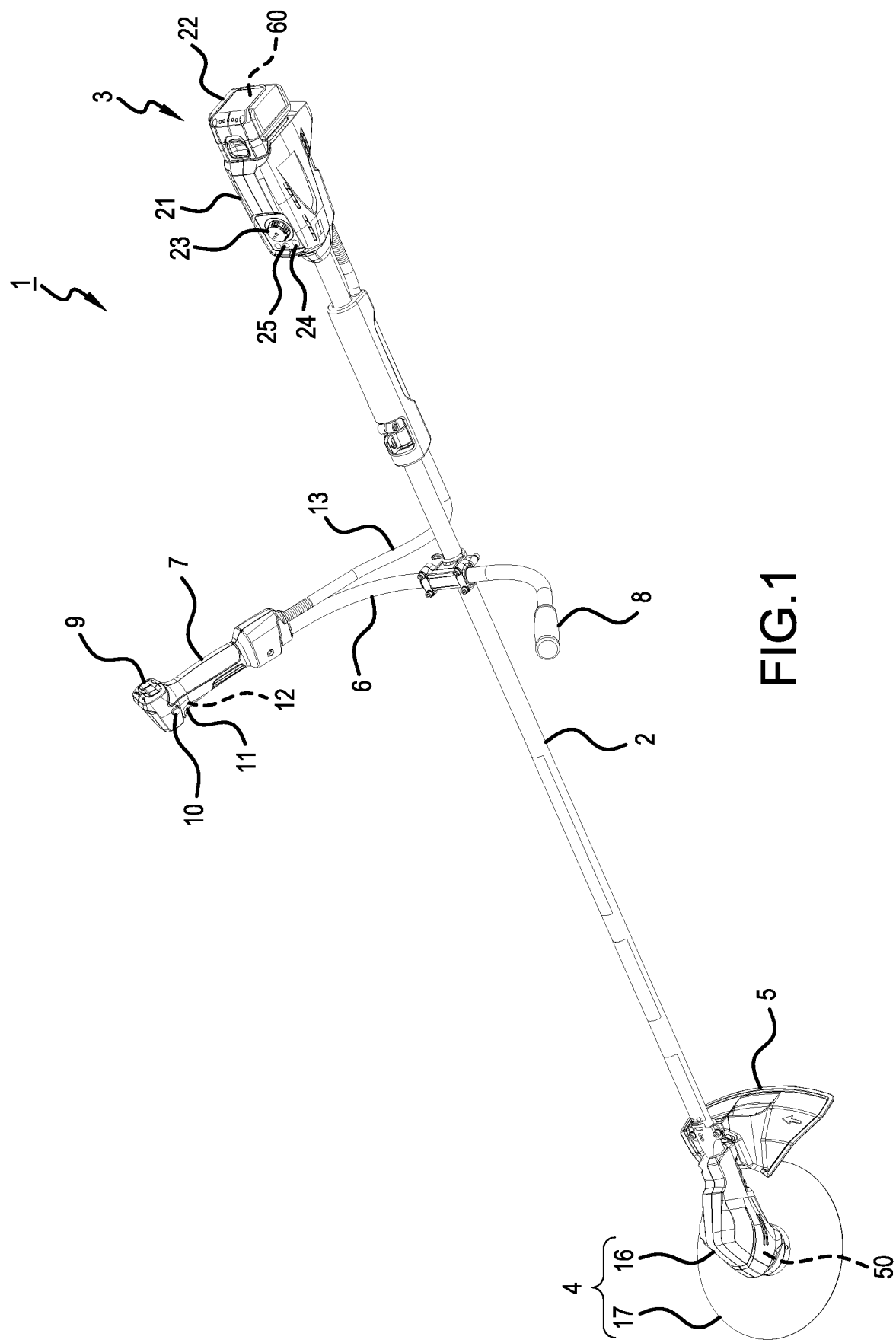
FIG. 1 is an oblique view that shows the external appearance of a work machine according to a first embodiment.

1 Work machine
2 Main pipe
3 Control unit
4 Drive unit
5 Cover
6 Handle
7 Right grip
8 Left grip
9 Forward/reverse-changing switch
10 Lock-off button
11 Trigger
12 Trigger switch
13 Control-wiring pipe
16 Motor housing
17 Cutting blade
21 Rear-end housing
22 Battery pack
23 Speed-changing dial
24 Main switch
25 Display part
28 Battery-voltage detecting part
30 Controller
32 Drive circuit
34 Gate circuit
36 Control circuit
38 Regulator
41 Positive-electrode terminal
42 Negative-electrode terminal
43 ES terminal
44 Serial terminal
50 Motor
52 Rotation sensor
54 Electric-current detecting part
56 Temperature-detecting part
60 Battery
61 Battery positive-electrode terminal
62 Battery negative-electrode terminal
63 Battery ES terminal
64 Battery serial terminal
65 Battery-control circuit

DETAILED DESCRIPTION OF THE INVENTION

Modes (embodiments) for carrying out the present disclosure are explained below, with reference to the drawings.

First Embodiment

1-1. Overall Configuration

As shown in FIG. 1, an illustrative embodiment will now be explained in which a grass trimmer is described as an example of an electric work machine according to the present disclosure. The work-machine system of the present illustrative embodiment comprises a work machine (power tool) 1 and a battery pack 22. The work machine 1 is a grass trimmer that comprises a main pipe 2, a control unit 3, a drive unit 4, a cover 5, and a handle 6. The main pipe 2 is formed into an elongate and hollow rod shape. The control unit 3 is provided on a rear-end side of the main pipe 2. The drive unit 4 and the cover 5 are provided on a front-end side of the main pipe 2.

The drive unit 4 comprises a motor housing 16 and a cutting blade 17. The cutting blade 17 is a disk-shaped blade for cutting objects such as grass, small-diameter trees, or the like and is configured such that it is attachable to and detachable from the motor housing 16. The cover 5 is provided to deter grass or the like, which has been cut by the cutting blade 17, from flying toward the user of the work machine 1.

A motor 50, which generates rotational force for rotating the cutting blade 17, is mounted in the interior of the motor housing 16. The rotational force generated by the drive of the motor 50 is transmitted, via a speed-reducing mechanism, to a rotary shaft, on which the cutting blade 17 is mounted. When the cutting blade 17 is being rotated by the rotational force of the motor 50, the user can cut an object by bringing an outer-circumferential portion of the cutting blade 17 into contact with the object.

The handle 6 is formed into a U shape and is connected to the main pipe 2 in the vicinity of an intermediate location of the main pipe 2 in the length direction. A right grip 7, which is gripped by the user using his or her right hand, is provided on a first end side of the handle 6, and a left grip 8, which is gripped by the user using his or her left hand, is provided on a second end side of the handle 6.

A forward/reverse-changing switch 9, a lock-off button 10, and a trigger 11 are provided on a tip side of the right grip 7. The forward/reverse-changing switch 9 switches the rotational direction of the motor 50, that is, the rotational direction of the cutting blade 17, to either forward rotation or reverse rotation. It is noted that forward rotation is the rotational direction that is set when grass or the like is to be cut and reverse rotation is the rotational direction that is set when grass or the like entangled in the cutting blade 17 is to be removed.

The trigger 11 is a manipulatable member that is manipulated by the user to give instructions for rotating or stopping the cutting blade 17. A trigger switch 12, which is operatively coupled with the trigger 11, is disposed in the interior of the right grip 7. The trigger switch 12 turns ON when the trigger 11 is manipulated and turns OFF when the trigger 11 is not manipulated; the trigger switch 12 outputs a trigger signal that indicates an ON state or an OFF state thereof. In the present embodiment, the trigger 11 corresponds to one example of a manipulatable part.

The lock-off button 10 is a button for impeding or inhibiting the erroneous operation of the cutting blade 17. In the state in which the lock-off button 10 is not depressed, the lock-off button 10 mechanically engages with the trigger 11. Thereby, movement of the trigger 11 is restricted, and therefore the trigger switch 12 is impeded or inhibited from entering the ON state. In the state in which the lock-off button 10 is depressed, engagement with the trigger 11 is released by the lock-off button 10.

A control-wiring pipe 13 is provided between a lower end of the right grip 7 and a front end of the control unit 3. The control-wiring pipe 13 is formed into a hollow rod shape, and a control wire harness is provided and disposed in the interior of the control-wiring pipe 13. The control wire harness is for electrically connecting the trigger switch 12 and the forward/reverse-changing switch 9 to the control unit 3.

The control unit 3 comprises a rear-end housing 21 and the battery pack 22.

A speed-changing dial 23 and a main switch 24 are provided, in a user-manipulatable state, on a front-end side of the rear-end housing 21. The speed-changing dial 23 is provided for the user to variably set the rotational speed of the motor 50. The main switch 24 is a switch for placing the work machine 1 in the operable state by starting the electric supply from a battery 60 to each part. When the main switch 24 is ON, a discharge path from the battery 60 to the motor 50 is formed; when the main switch 24 is OFF, the discharge path from the battery 60 to the motor 50 is cut off. In the present embodiment, the main switch 24 corresponds to one example of a main-power-supply switch.

Furthermore, a display part 25 is provided, in a manner visible to the user, on the front-end side of the rear-end housing 21. The display part 25 is provided to inform the user of the operation state, an abnormality, or the like and comprises a display lamp, remaining-display lamps, a reverse-rotation display lamp, etc. The display lamp turns ON when the main switch 24 turns ON and thereby electric power is supplied to each part of the work machine 1. The remaining-capacity display lamps indicate the remaining capacity of the battery 60. The reverse-rotation display lamp indicates that the motor 50 is rotating in reverse. It is noted that the remaining capacity is the amount of electric power remaining in the battery 60.

A controller 30, which is described below, is disposed in the interior of the rear-end housing 21. The controller 30 principally performs drive control of the motor 50. The controller 30 controls the rotational speed of the motor 50 by controlling the amount of electrical current supplied to the motor 50.

The battery pack 22 is configured such that it is attachable to and detachable from a rear-end portion of the rear-end housing 21.

Figure 2:
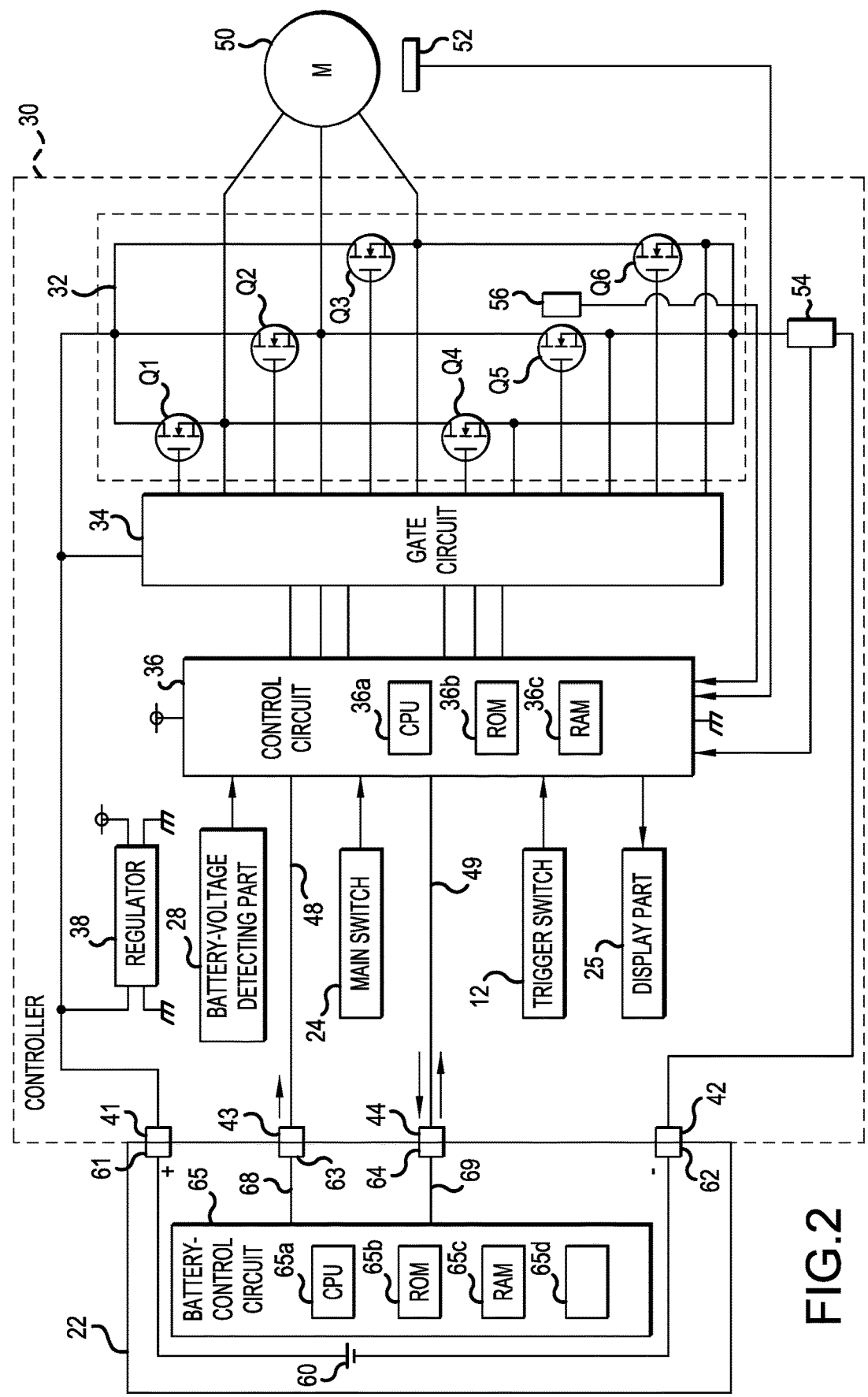
FIG. 2 is a block diagram that shows the configuration of a motor-control system according to the first embodiment.

As shown in FIG. 2, the battery pack 22 comprises the battery 60, a battery-control circuit 65, a battery positive-electrode terminal 61, a battery negative-electrode terminal 62, a battery ES terminal 63, and a battery serial terminal 64. The battery 60 is configured such that multiple battery cells are connected in series. The battery 60 is a rechargeable power supply for supplying electric power to each part inside the rear-end housing 21 and to the motor 50. The battery 60 comprises, as one example, a lithium-ion secondary battery. In addition, the rated voltage of the battery 60 may be, for example, 64 V.

1-2. Configuration of Motor-Control System

Next, a control system for controlling the drive (energization) of the motor 50 will now be explained, with reference to FIG. 2. The control system comprises the battery-control circuit 65 and the controller 30.

The battery-control circuit 65 comprises a CPU 65a, ROM 65b, RAM 65c, memory 65d such as flash memory, I/O, etc.

The battery positive-electrode terminal 61 is connected to a positive-electrode side of the battery 60. The battery negative-electrode terminal 62 is connected to a negative-electrode side of the battery 60. The battery ES terminal 63 is connected to the battery-control circuit 65 via a first battery-connection wire 68. The battery ES terminal 63 is a terminal that outputs a discharge-permit signal or a discharge-prohibit signal from the battery pack 22. ES is an abbreviation for error stop.

The battery serial terminal 64 is connected to the battery-control circuit 65 via a second battery-connection wire 69. The battery serial terminal 64 is a terminal that outputs a plurality of battery information via serial communication. The plurality of battery information includes state information concerning the discharge state of the battery pack 22. The state information includes a protection-counter value, a counter threshold, the battery temperature, the remaining capacity of the battery 60, and the like, which are described below. Furthermore, the state information may include counter-map information, an addition threshold, a subtraction threshold, etc., which are described below.

In addition, the battery pack 22 comprises a cell-voltage detecting part, a cell-temperature detecting part, and a battery-current detecting part, which are not shown. The cell-voltage detecting part detects the voltage value of each cell of the battery 60 and outputs detection signals to the battery-control circuit 65. The cell-temperature detecting part is constituted by a thermistor or the like, detects the temperature of at least one cell, and outputs a detection signal to the battery-control circuit 65. The battery-current detecting part detects the discharge current flowing through the battery 60 when it is discharging and outputs a detection signal to the battery-control circuit 65.

The controller 30 comprises a positive-electrode terminal 41, a negative-electrode terminal 42, an ES terminal 43, and a serial terminal 44. Furthermore, the controller 30 comprises a drive circuit 32, a gate circuit 34, a control circuit 36, and a regulator 38.

The positive-electrode terminal 41 is connected to the battery positive-electrode terminal 61 of the battery pack 22. The negative-electrode terminal 42 is connected to the battery negative-electrode terminal 62 of the battery pack 22. The ES terminal 43 is a terminal that is connected to a battery ES terminal of the battery pack 22 and is a terminal to which is input the discharge-permit signal or the discharge-prohibit signal transmitted from the battery pack 22. The serial terminal 44 is a terminal to which is input battery information transmitted from the battery pack 22 by serial communication.

The ES terminal 43 is connected to the control circuit 36 via a first connection wire 48, and the serial terminal 44 is connected to the control circuit 36 via a second connection wire 49.

The drive circuit 32 is a circuit that receives the supply of electric power from the battery 60 and supplies electric current to winding wires corresponding to each phase of the motor 50. The motor 50 is a three-phase brushless motor. The drive circuit 32 is a three-phase, full-bridge circuit that comprises high-side switching devices Q1-Q3 and low-side switching devices Q4-Q6. Each of the switching devices Q1-Q6 includes, for example, a MOSFET but may include a device other than a MOSFET.

The gate circuit 34 turns each of the switching devices Q1-Q6 of the drive circuit 32 ON or OFF in accordance with control signals output from the control circuit 36 and, by sequentially supplying electric current to the winding wires of every phase of the motor 50, causes the motor 50 to rotate. It is noted that, when all the switching devices Q1-Q6 have been turned OFF, the motor 50 enters a free-run state. In addition, when all the switching devices Q1-Q3 have been turned OFF and all the switching devices Q4-Q6 have been turned ON, the motor 50 enters the state in which so-called short-circuit braking has been applied.

When the main switch 24 is ON, the regulator 38 receives the supply of electric power from the battery 60 and generates a constant power-supply voltage Vcc (e.g., 5 VDC) needed to operate the control circuit 36.

The control circuit 36 comprises a CPU 36a, ROM 36b, RAM 36c, I/O, etc. The ES terminal 43, the serial terminal 44, the trigger switch 12, the main switch 24, the display part 25, and a battery-voltage detecting part 28 are connected to the control circuit 36. In addition, although not shown, the forward/reverse-changing switch 9 and the speed-changing dial 23 are also connected to the control circuit 36.

The battery-voltage detecting part 28 detects the voltage between the positive-electrode terminal 41 and the negative-electrode terminal 42, that is, the value of the voltage of the battery 60 (hereinbelow, a battery voltage), and outputs a detection signal to the control circuit 36.

In addition, in the controller 30, an electric-current detecting part 54, which detects the discharge-current value supplied to the motor 50, is provided in an energization path extending from the drive circuit 32 to the negative electrode of the battery 60. Furthermore, a rotation sensor 52, which detects the rotational position of a rotor contained in the motor 50, is provided in the vicinity of the motor 50. The rotation sensor 52 is, for example, a Hall-effect sensor, an optical encoder, a magnetic encoder, or the like. Furthermore, a temperature-detecting part 56, which is constituted by a thermistor, or the like, that detects the temperature of the switching devices, is provided in the vicinity of the switching devices of the drive circuit 32. Furthermore, detection signals from the electric-current detecting part 54, the rotation sensor 52, the temperature-detecting part 56, etc. are also input to the control circuit 36. The control circuit 36 calculates the rotational position and the rotational speed of the motor 50 based on the detection signal from the rotation sensor 52.

The control circuit 36 receives the supply of electric power from the regulator 38 and thereby operates. The control circuit 36 performs various processes, including a main process that is described below, based on the various detection signals and the various switch-manipulation states. In the present embodiment, the control circuit 36 corresponds to one example of a control part.

1-3. Processes of Electric Work Machine

<1-3-1. Main Process>

Figure 3:
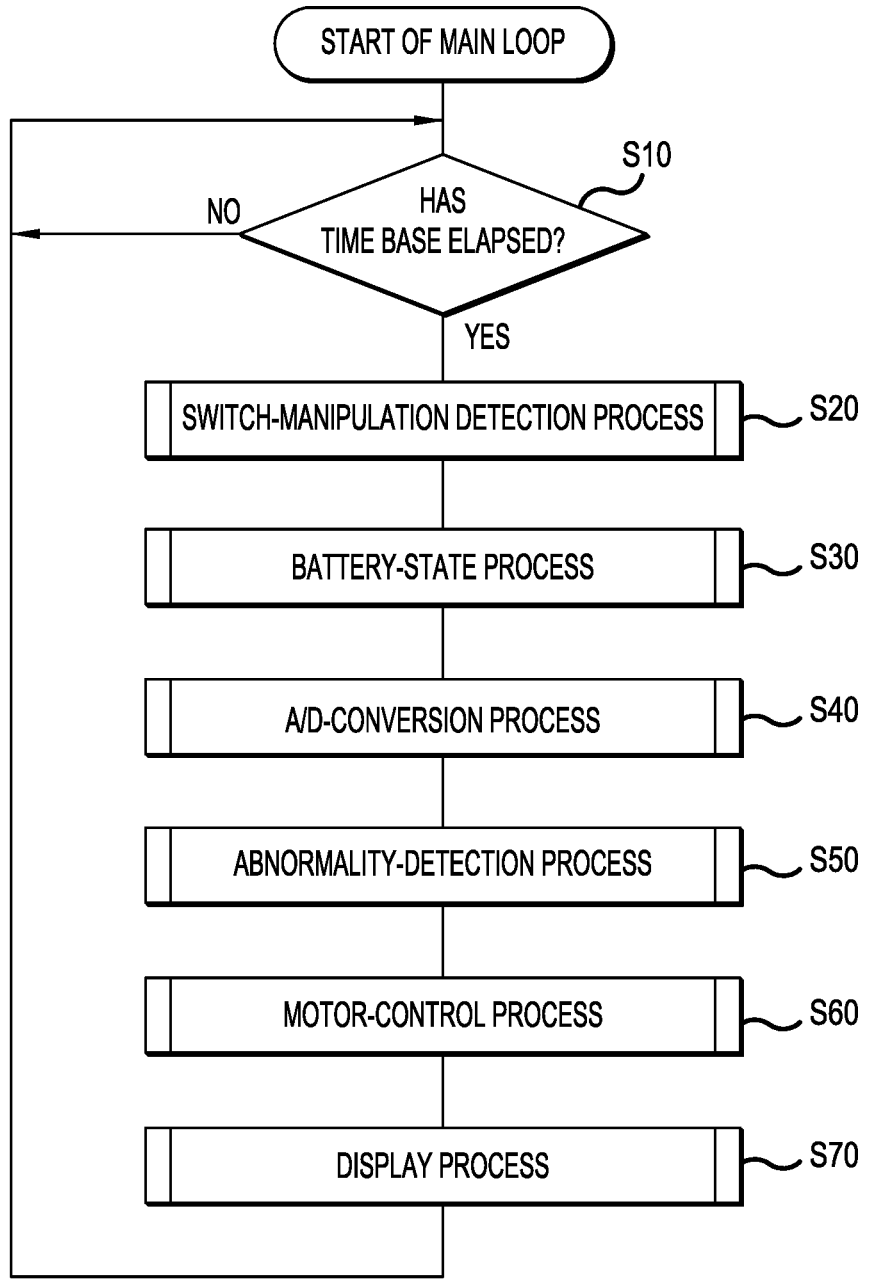
FIG. 3 is a flow chart that shows a main process performed by a control circuit of the work machine according to the first embodiment.

Next, a main process, which is performed by the control circuit 36 of the work machine 1, will be explained, with reference to the flow chart in FIG. 3.

First, in S10, the control circuit 36 determines whether a time base has elapsed. If the time base has not elapsed, the control circuit 36 stands by; if the time base has elapsed, the control circuit 36 proceeds to the process of S20. The time base corresponds to a control cycle of the control circuit 36.

In S20, the control circuit 36 performs a process of detecting manipulation of the trigger switch 12. In greater detail, the control circuit 36 detects, based on a signal from the trigger switch 12, whether the trigger switch 12 is ON or OFF.

Then, in S30, the control circuit 36 performs a battery-state process based on information output from the battery pack 22. The details of the battery-state process are described below.

Then, in S40, the control circuit 36 performs an A/D-conversion process. In greater detail, the control circuit 36 performs A/D conversion of the detection signals input from the battery-voltage detecting part 28, the electric-current detecting part 54, and the temperature-detecting part 56. Thereby, the control circuit 36 acquires the value of the discharge current supplied to the motor 50, the value of the voltage of the battery 60, and the temperature(s) of the switching devices.

Next, in S50, the control circuit 36 performs an abnormality-detection process. In greater detail, the control circuit 36 detects whether one or more abnormalities has occurred, such as an overcurrent, a drop in battery voltage, a high temperature state of the switching devices, and the like, by comparing the discharge-current value, the voltage value, and the temperature(s) obtained in S40 with the respective thresholds.

Then, in S60, the control circuit 36 performs the motor-control process based on the manipulation state of the trigger switch 12, the battery state, and the abnormality detection result. The details of the motor-control process are described below.

Next, in S70, the control circuit 36 performs a display process. In greater detail, the control circuit 36 notifies the user by displaying the operation state of the motor 50, the remaining capacity (remaining charge) of the battery 60, any detected abnormality, etc. The present process ends with the above.

<1-3-2. Battery-State Process>

Next, the details of the battery-state process, which is performed by the control circuit 36 in S30, will be explained, with reference to the flow chart in FIG. 4.

First, in S100, the control circuit 36 performs a battery-communication process. In greater detail, when the work machine 1 detects that the battery pack 22 has been mounted, the control circuit 36, in an initial communication with the battery pack 22, transmits a model number of the work machine 1 and receives a model number of the battery pack 22 via the serial terminal 44. Furthermore, the control circuit 36 may receive counter-map information in the initial communication with the battery pack 22.

Furthermore, the control circuit 36 transmits an information-request signal to the battery-control circuit 65 via the serial terminal 44 with a prescribed cycle and receives the battery information from the battery-control circuit 65 in response to the information-request signal. Here, when a discharge current is not flowing from the battery pack 22 to the work machine 1, the cycle with which the information-request signal is transmitted is set longer than when a discharge current is flowing from the battery pack 22 to the work machine 1. That is, when a discharge current is not flowing from the battery pack 22 to the work machine 1, the frequency of the serial communication is set to be lower than when a discharge current is flowing.

In addition, after the main switch 24 has entered the ON state and from a point in time before the driving of the motor 50, the control circuit 36 transmits an information-request signal to the battery-control circuit 65 and starts requesting battery information from the battery pack 22.

Next, in S110, the control circuit 36 sets 'permitted' or 'prohibited' with respect to discharging from the battery pack 22. Specifically, when a discharge-permit signal has been received from the battery pack 22, the control circuit 36 sets a discharge-permit flag. On the other hand, when a discharge-prohibit signal has been received from the battery pack 22, the control circuit 36 clears the discharge-permit flag. The present process ends with the above.

<1-3-3. Motor-Control Process>

Next, the details of the motor-control process, which is performed by the control circuit 36 in S60, will be explained, with reference to the flow chart in FIG. 5.

First, in S300, the control circuit 36 determines whether the trigger switch 12 is ON. If it has been determined that the trigger switch 12 is ON, the control circuit 36 proceeds to the process of S310; on the other hand, if it has been determined that the trigger switch 12 is OFF, the control circuit 36 proceeds to the process of S340.

In S310, the control circuit 36 determines whether an abnormality has been detected in S50. If an abnormality has not been detected, the control circuit 36 proceeds to the process in S320. On the other hand, if an abnormality has been detected, the control circuit 36 proceeds to the process in S340.

In S320, the control circuit 36 determines whether the discharge-permit flag is set. If it has been determined that the discharge-permit flag is set, the control circuit 36 proceeds to the process of S330; on the other hand, if it has been determined that the discharge-permit flag is cleared, the control circuit 36 proceeds to the process of S340.

In S330, the control circuit 36 performs the motor-drive process by receiving the supply of electric power from the battery 60, after which the present process ends. The details of the motor-drive process are described below.

On the other hand, in S340, the control circuit 36 determines whether to perform braking control. Specifically, if the motor 50 is rotating and there will be no effect on the controller 30 even if the motor 50 is caused to generate a braking force, the control circuit 36 determines that braking control is to be performed. In this situation, the control circuit 36 sets a brake flag in S350 and then ends the present process. Thereby, the supply of electric power from the battery 60 to the motor 50 is stopped, and short-circuit braking is performed.

On the other hand, if the motor 50 is not rotating or if there would be an effect on the controller 30 when the motor 50 is rotating and the motor 50 is caused to generate a braking force, the control circuit 36 determines that braking control is not to be performed. In this situation, the control circuit 36 clears the brake flag in S360 and then ends the present process. Thereby, the supply of electric power from the battery 60 to the motor 50 is stopped. Then, in the situation in which the motor 50 is still rotating, free run or the like is permitted until the motor 50 stops.

<1-3-4. Motor-Drive Process>

Next, the details of the motor-drive process, which is performed by the control circuit 36 in S330, will be explained, with reference to the flow chart in FIG. 6.

First, in S400, the control circuit 36 performs a rotational-speed setting process, which sets a target rotational speed of the motor 50. In greater detail, the control circuit 36 sets the rotational direction of the motor 50 based on the setting of the forward/reverse-changing switch 9. Then, the control circuit 36 sets the target rotational speed of the motor 50 in the set rotational direction based on the setting of the speed-changing dial 23.

Next, in S410, the control circuit 36 performs an upper-limit-value setting process, which sets an upper-limit value of the discharge current. The upper-limit value is used for controlling the amount of discharge current supplied to the motor 50. The control circuit 36 then controls (limits) the value of the discharge current to the upper-limit value or less. The details of the upper-limit-value setting process are described below.

Next, in S420, the control circuit 36 performs a process of calculating the duty ratio for use in pulse-width modulation (PWM) control. Using the duty ratio that was calculated, the control circuit 36 performs PWM control of the electric current that flows to the motor 50. In S420, the control circuit 36 calculates the duty ratio for use in PWM control such that the following Conditions (1) and (2) are met. Condition (1) is that the discharge current becomes less than or equal to the current-upper-limit value set in S410. Condition (2) is that the rotational speed of the motor 50 converges to the target rotational speed set in S400. In the situation in which both Conditions (1) and (2) cannot be met, the control circuit 36 prioritizes meeting Condition (1) and calculates the duty ratio such that, as long as Condition (1) is met, the rotational speed of the motor 50 approaches the target rotational speed as much as possible.

Next, in S430, the control circuit 36 performs a duty-ratio outputting process. In greater detail, the control circuit 36 generates control instructions based on the duty ratio calculated in S420 and outputs the generated control instructions to the gate circuit 34. The present process ends with the above.

<1-3-5. Current-Upper-Limit-Value Setting Process>

Next, the details of a current-upper-limit-value setting process, which is performed by the control circuit 36 in S410, will be explained, with reference to the flow chart in FIG. 7.

First, in S500, it is determined whether the protection-counter value acquired from the battery pack 22 is greater than the counter threshold. The battery-control circuit 65 generates the protection-counter value by integrating (i.e., cumulating) addition values, which are each determined in accordance with the prevailing magnitude of the discharge current of the battery 60, as will be explained below.

That is, if the discharge-current value is determined to be the addition threshold or greater, the battery-control circuit 65 will add an addition value to the protection-counter value. Furthermore, the greater the discharge-current value, the greater the addition value selected by the battery-control circuit 65. For example, if the addition threshold is set to be 50 A, the battery-control circuit 65 does not add any value to the protection-counter value when the discharge-current value is less than 50 A. In addition, the battery-control circuit 65 will add the addition value of "1" to the protection-counter value when the discharge-current value is 50 A and will add the addition value of "3" to the protection-counter value when the discharge-current value is 70 A. In every control cycle, the battery-control circuit 65 adds one addition value, which is determined in accordance with the prevailing magnitude of the discharge current, to the protection-counter value. Thereby, the integrated value (i.e., the cumulative value) of the addition values becomes the protection-counter value. Furthermore, the greater the discharge-current values, as well as the longer the time that a discharge current of a magnitude whose value is the addition threshold or greater flows, the greater the protection-counter value becomes. On the other hand, if the discharge-current value is determined to be the subtraction threshold or less, the battery-control circuit 65 will subtract a prescribed value from the protection-counter value. The subtraction threshold is, for example, 5 A.

The battery 60 is prone to deteriorate when it enters an overcurrent state (i.e., a state in which the battery 60 is overloaded) in which a comparatively large electric current flows for a comparatively long time. Consequently, when the protection-counter value exceeds a protection threshold, the battery-control circuit 65 performs a protection operation to prevent deterioration of the battery 60 caused by being overloaded. Specifically, the battery-control circuit 65 transmits a discharge-prohibit signal to the control circuit 36 to shut down further discharge of the battery 60. The counter threshold used in the determination in S500 is a value that is smaller than the protection threshold, for example, a value of 50%-70% of the protection threshold.

That is, in S500, before the protection function of the battery pack 22 operates, the control circuit 36 determines whether a sign or warning that the protection function of the battery pack 22 will operate (will be executed) has been detected. In S500, if the protection-counter value is the counter threshold or less, that is, in the situation in which a sign that the protection function of the battery pack 22 will operate is not being detected, the control circuit 36 proceeds to the process in S510. On the other hand, if the protection-counter value in S500 is greater than the counter threshold, that is, in the situation in which a sign or warning has been detected that the protection function of the battery pack 22 will operate (if no current-reducing measure is taken), the control circuit 36 proceeds to the process in S520.

In S510, the control circuit 36 sets the current-upper-limit value to a normal current value. The normal current value is an electric-current value that is greater than or equal to the addition threshold.

On the other hand, in S520, the control circuit 36 sets the current-upper-limit value to a limited-current value or reduced-current value. The limited-current value is an electric-current value that is less than the addition threshold. That is, the limited-current value is a value that holds the protection-counter value to a specified value or less because the corresponding addition value is zero.

Here, when the load on the motor 50 increases, the discharge current increases to cause the rotational speed of the motor 50 to converge to the target rotational speed. Consequently, if the load on the motor 50 increases in the state in which the protection-counter value exceeds the counter threshold, then there is a possibility that the protection-counter value will reach the protection threshold and therefore the protection function of the battery pack 22 will operate (will be executed). When the protection function of the battery pack 22 operates, discharging of the battery pack 22 stops, electric power is no longer supplied to the motor 50, and the motor 50 stops. In turn, the user can no longer continue work (usage of the work machine 1), and thereby work efficiency drops.

Accordingly, when a sign has been detected that the protection function of the battery pack 22 will operate (if no current-reducing measure is taken), the control circuit 36 limits the discharge-current value to a value that is smaller than the addition threshold. Thereby, even if the load on the motor 50 increases, the protection-counter value does not increase, and consequently the protection function of the battery pack 22 does not operate. Accordingly, although there are situations in which, by virtue of limiting the discharge-current value, the rotational speed of the motor 50 becomes lower than the target rotational speed, the user can continue to use the work machine 1 in a reduced-output state.

Figure 8:
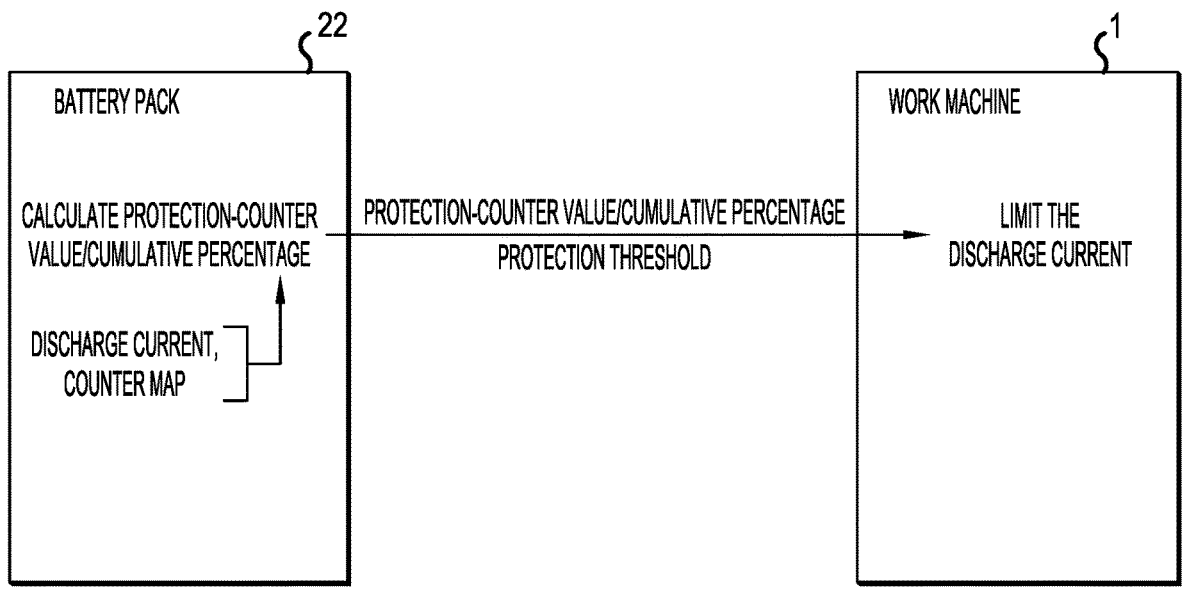
FIG. 8 schematically shows the flow of data between a battery pack and the work machine according to the first embodiment.

FIG. 8 shows an overview of the flow of data between the battery pack 22 and the work machine 1 in the situation in which the main process according to the present embodiment was performed. In the battery pack 22, the protection-counter value is calculated from the discharge current and a counter map. The counter map is a map that indicates (provides, contains) a correspondence relationship between discharge-current values on one side and addition values and subtraction values (i.e., negative addition values) on the other side (refer to FIG. 19 and FIG. 26). In the battery pack 22, the protection-counter value is calculated by cumulating, every prescribed cycle, the addition value or the subtraction value corresponding to the discharge-current value in the counter map.

Then, the protection-counter value that was calculated and the protection threshold this is saved in the battery pack 22 are transmitted from the battery pack 22 to the work machine 1. In the work machine 1, the discharge current is limited using the received protection-counter value and the counter threshold, which is smaller than the protection threshold.

Figure 9:
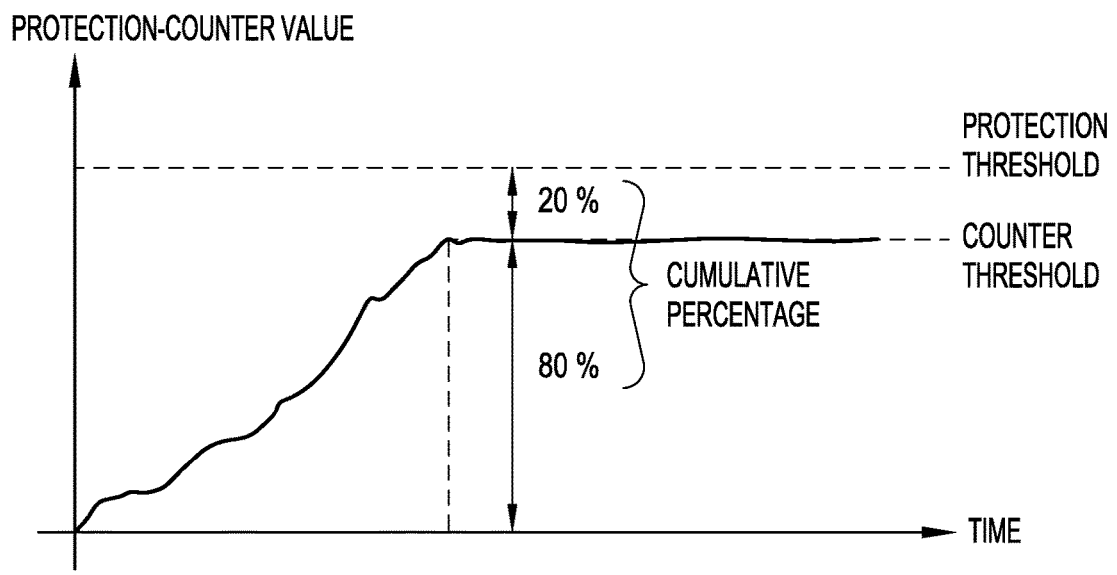
FIG. 9 shows the cumulative percentage transmitted from the battery pack to the work machine according to the first embodiment.

In addition, instead of the protection-counter value, a cumulative percentage may be transmitted from the battery pack 22 to the work machine 1. As shown in FIG. 9, the cumulative percentage is the percentage of the present protection-counter value with respect to the protection threshold in the situation in which the protection threshold has been set to 100%. In this situation, the counter threshold is expressed as a percentage (e.g., 80%) of the protection threshold.

<1-3-6. Operation of Work Machine>

Figure 10:
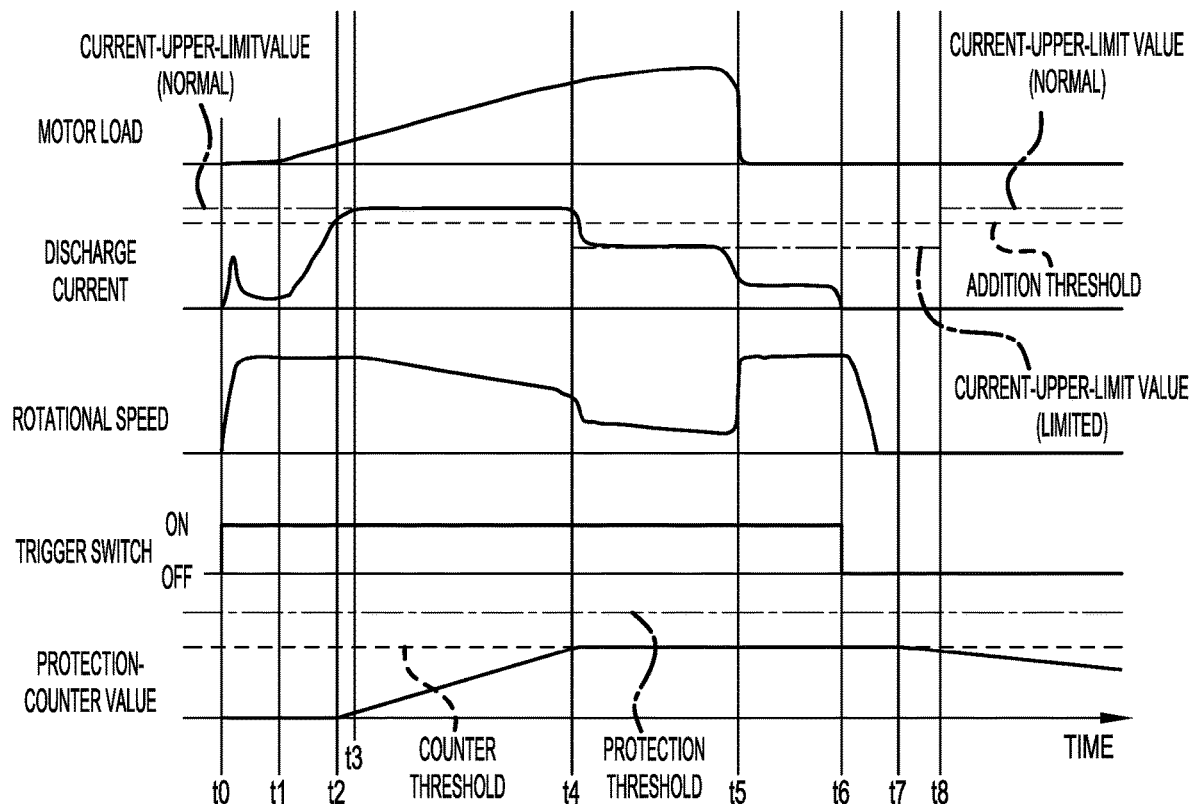
FIG. 10 is a time chart of a motor load, a current-upper-limit value, a discharge current, a rotational speed, a trigger switch, and a protection-counter value according to the first embodiment.

Next, the operation of the work machine 1 will be explained, with reference to the time chart in FIG. 10.

At the point in time t0, when the trigger switch 12 is turned ON, a discharge current begins to flow, and the rotational speed of the motor 50 begins to increase. Then, in the interval from the point in time t1 to the point in time t5, the motor load gradually increases, and the motor load becomes zero at the point in time t5.

In the interval from the point in time t1 to the point in time t2, the discharge current also increases as the motor load increases. Then, at the point in time t2, the discharge-current value becomes the addition threshold or greater, and therefore the protection-counter value begins to increase.

At the point in time t3, the discharge current reaches the current-upper-limit value. The current-upper-limit value at this time is the normal set value. In the interval from when the rotational speed of the motor 50 reaches the target rotational speed until the point in time t3, the target rotational speed is maintained.

In the interval from the point in time t3 to the point in time t4, while the motor load is increasing, the discharge current is constrained to the current-upper-limit value. Consequently, in the interval from the point in time t3 to the point in time t4, the rotational speed of the motor 50 is dropping. In addition, in this interval, because the discharge-current value is the addition threshold or greater, the protection-counter value is increasing.

Then, at the point in time t4, when the protection-counter value exceeds the counter threshold, the current-upper-limit value is set to the limited-current value. Thereby, because the discharge current is constrained to less than the addition threshold, the increasing of the protection-counter value stops. Consequently, in the interval from the point in time t4 to the point in time t7, the protection-counter value is held to a specified value. In addition, in the interval from the point in time t4 to the point in time t5, because the discharge-current value is limited to the limited-current value, which is smaller than the normal set value, the rotational speed of the motor 50 drops further.

At the point in time t5, the load on the motor 50 becomes zero. Attendant therewith, the discharge current becomes smaller than the current-upper-limit value, and the rotational speed of the motor 50 returns to the target rotational speed.

Then, at the point in time t6, when the trigger switch 12 is turned OFF, the discharge-current value becomes zero. That is, the discharge current no longer flows. Thereafter, at the point in time t7, attendant with the discharge current no longer flowing, the protection-counter value begins to decrease. Furthermore, at the point in time t8, attendant with the protection-counter value falling below the counter threshold, the current-upper-limit value is set (re-set) to the normal set value.

Hypothetically speaking, at the point in time t4, if the current-upper-limit value were to instead remain set at the normal set value without changing, the protection-counter value would continue to increase until reaching the protection threshold. Then, at the point in time at which the protection-counter value has reached the protection threshold, the protection function of the battery pack 22 would operate, the motor 50 would stop, and the user could no longer continue to perform work. In contrast, in the present embodiment, because the current-upper-limit value is constrained (limited) to the limited-current value at the point in time t4, the user can continue to perform work (at a reduced output) in the interval until the user turns the trigger 11 OFF.

1-4. Processes in the Battery Pack

<1-4-1. History Process>

Figure 11:
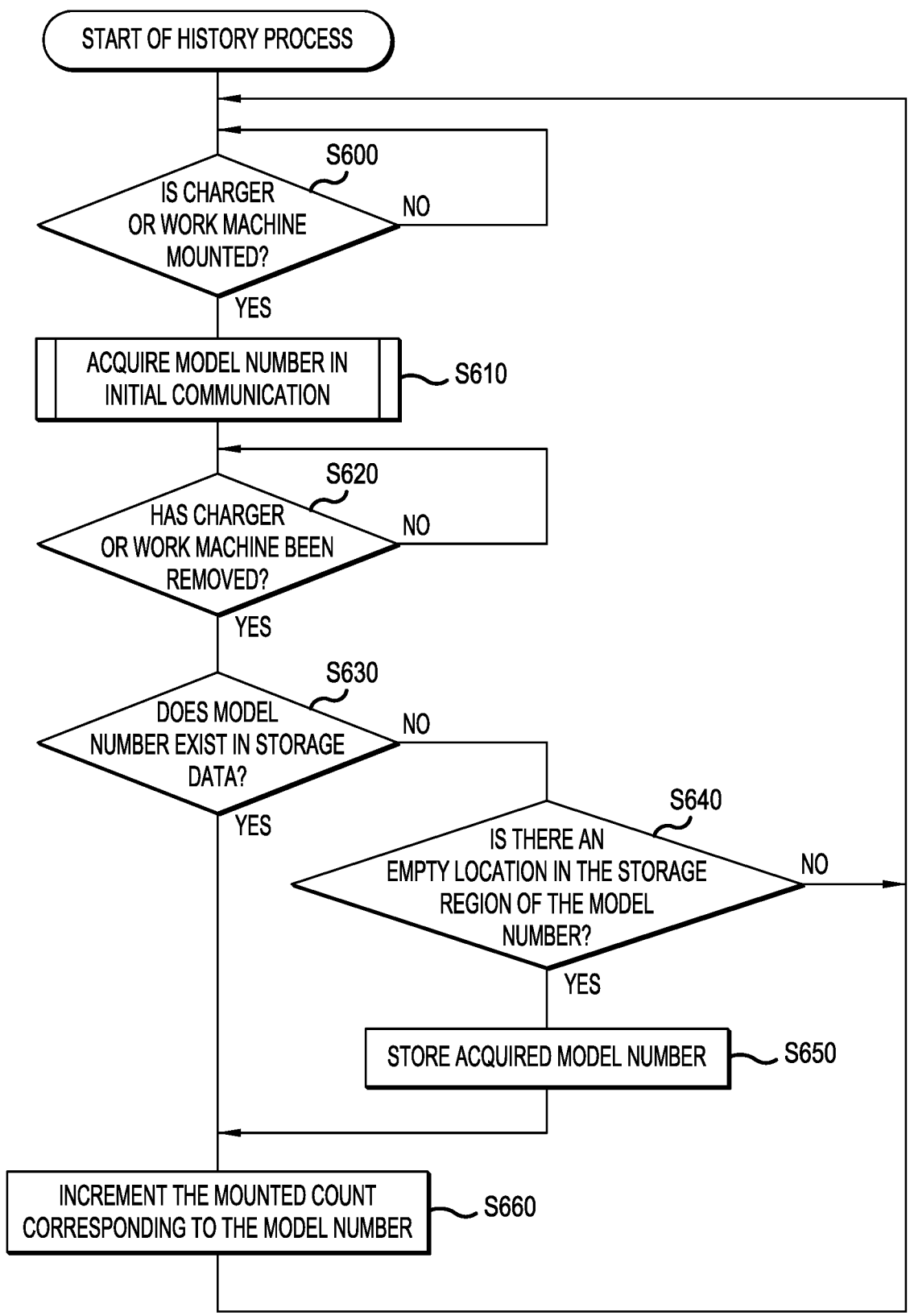
FIG. 11 is a flow chart that shows a history process performed by a battery-control circuit according to the first embodiment.

Next, a history process, which is performed by the battery-control circuit 65, will be explained, with reference to the flow chart in FIG. 11.

First, in S600, the battery-control circuit 65 determines whether a charger or a work machine is mounted on the battery pack 22. If a charger or a work machine is not mounted on the battery pack 22, the battery-control circuit 65 repetitively performs the process in S600 until one of them is mounted. On the other hand, when a charger or a work machine has been mounted on the battery pack 22, the battery-control circuit 65 proceeds to the process in S610.

In S610, the battery-control circuit 65 performs initial communication with the charger or the work machine (hereinbelow, the mounted apparatus) mounted on the battery pack 22, transmits the model number of the battery pack 22, and acquires the model number of the mounted apparatus transmitted from the mounted apparatus.

Next, in S620, the battery-control circuit 65 determines whether the mounted apparatus has been removed from the battery pack 22. If the mounted apparatus has not yet been removed, the battery-control circuit 65 repetitively performs the process in S620 until the mounted apparatus has been removed. Then, when the mounted apparatus has been removed from the battery pack 22, the battery-control circuit 65 proceeds to the process in S630.

In S630, the battery-control circuit 65 determines whether the model number of the mounted apparatus acquired in S610 exists in a history database in the memory 65d of the battery pack 22. As shown in FIG. 12 and FIG. 13, the history database includes both a charger-storage region, which stores the number of times a charger has been mounted, and a work-machine storage region, which stores the number of times that a work machine has been mounted. The model number of each charger and the corresponding mounted count of the charger of that model number are stored correlated with one another in the charger-storage region. The model number of each work machine and the corresponding mounted count of the work machine of that model number are stored correlated with one another in the work-machine storage region.

If the mounted apparatus is a charger, the battery-control circuit 65 determines whether the model number acquired in S610 exists in the charger-storage region. In addition, if the mounted apparatus is a work machine, the battery-control circuit 65 determines whether the model number acquired in S610 exists in the work-machine storage region.

The battery-control circuit 65 proceeds to the process in S640 in the situation in which the model number of the mounted apparatus does not exist in the history database and proceeds to the process in S660 in the situation in which the model number of the mounted apparatus exists in the history database.

In S640, the battery-control circuit 65 determines whether there is an empty location in the corresponding storage region of the history database. Specifically, in the situation in which the mounted apparatus is a charger, the battery-control circuit 65 determines whether there is an empty location in the charger-storage region. In addition, in the situation in which the mounted apparatus is a work machine, the battery-control circuit 65 determines whether there is an empty location in the work-machine storage region. In the situation in which there is no empty location in the corresponding storage region of the history database, the battery-control circuit 65 returns to the process in S600; in the situation in which there is an empty location in the corresponding storage region of the history database, the battery-control circuit 65 proceeds to the process in S650.

In S650, the battery-control circuit 65 stores, in the corresponding storage region, the model number of the mounted apparatus that was acquired in S610. Specifically, when the mounted apparatus is a charger, the battery-control circuit 65 stores the acquired model number in an empty location of the charger-storage region. In addition, when the mounted apparatus is a work machine, the battery-control circuit 65 stores the acquired model number in an empty location of the work-machine storage region.

Generally, there are more types of model numbers of work machines than types of model numbers of chargers. Consequently, if the history database were to have only one storage region, then there is a possibility that model numbers of work machines will be successively stored in the storage region, and empty locations for storing new model numbers of chargers will run out. In contrast, because the history database has a separate charger-storage region and work-machine storage region, even if the number of types of model numbers of work machines mounted on the battery pack 22 increases, it is possible to ensure a sufficiently large region for storing new model numbers of chargers.

Next, in S660, the battery-control circuit 65 increments the mounted count corresponding to the model number that was acquired in S610. Specifically, when the mounted apparatus is a charger, the battery-control circuit 65 increases by "1" the mounted count corresponding to the model number, from among the model numbers stored in the charger-storage region, that was acquired in S610. In addition, when the mounted apparatus is a work machine, the battery-control circuit 65 increases by "1" the mounted count corresponding to the model number, from among the model numbers stored in the work-machine storage region, that was acquired in S610. The present process ends with the above.

With regard to the history process, when a mounted apparatus has been mounted on the battery pack 22, the model number of the mounted apparatus is acquired; when the mounted apparatus has been removed from the battery pack 22, the model number is written to the memory 65*d* and the mounted count in the memory 65*d* is updated. When the mounted apparatus is mounted on the battery pack 22, because the battery-control circuit 65 performs the processes of charging control, discharging control, communication with the mounted apparatus, etc., the processing load is high, and therefore there may be no leeway (time or availability) to execute the write to the memory 65*d* and the updating of the memory 65*d*. Consequently, until the mounted apparatus has been removed from the battery pack 22, that is, until sufficient time is available, the battery-control circuit 65 suspends execution of the write to the memory 65*d* and the updating of the memory 65*d*. Thereby, the battery-control circuit 65 can reliably perform the write to the memory 65*d* and the updating of the memory 65*d*.

1-5. Effects

According to the first embodiment as explained above, the following effects are obtained.

(1) Based on the state information of the battery pack 22 that was acquired, the control circuit 36 reduces the current-upper-limit value of the discharge current before the protection function of the battery pack 22 operates. Thereby, because the discharge current is limited, even though the load on the work machine 1 is comparatively high, the user can continue use of the work machine 1 within an electric-power-consumption range in which the protection function of the battery pack 22 will not operate. In addition, if the protection-counter value were to exceed the protection threshold (even though the discharge current had been reduced), the protection function will still operate. That is, if the battery pack 22 requires protection to reduce the likelihood of deterioration caused by overload of the battery 60, the protection function will operate (be executed). Thereby, when the battery pack 22 should be protected, the protection function of the battery pack 22 is caused to operate while, at the same time, user convenience can be enhanced by extending usage of the battery pack 22 owing to the reduction of the discharge current in a high load situation.

(2) The overcurrent state (i.e., the overloaded state) of the battery pack 22 can be determined based on the magnitude of the discharge current and the time that the discharge current has been flowing. Thereby, the control circuit 36 can determine the overcurrent state of the battery pack 22 based on the protection-counter value, which has cumulated (added up) addition values or subtraction values, which were each determined in accordance with the prevailing magnitude of the discharge current at the time of sampling.

(3) When the protection-counter value exceeds the counter threshold, which is smaller than the protection threshold, the electric power supplied from the battery pack 22 to the motor 50 is reduced. Thereby, the motor 50 can continue to receive electric power from the battery pack 22 within the electric-power-consumption range in which the protection function of the battery pack 22 does not operate.

(4) That is, when the protection-counter value has exceeded the counter threshold, the current-upper-limit value of the discharge current is reduced. Because the current-upper-limit value is reduced, the discharge-current value is reduced, and the electric power supplied to the motor 50 is reduced. In turn, an increase in the protection-counter value can be restrained, and the operation of the protection function of the battery pack 22 can be restrained (delayed with the possibility of being averted).

(5) The protection-counter value, the addition threshold, and the subtraction threshold are acquired before the driving (energization) of the motor 50, and the current-upper-limit value is updated based on these acquired values. Thereby, in the situation in which the motor 50 is temporarily stopped and then restarted, the motor 50 is restarted without the current-upper-limit value being updated to the normal set value from the set value prior to the temporary stop. Thereby, the motor 50 can be restarted within the electric-power-consumption range in which the protection function of the battery pack 22 does not operate.

(6) After the main switch 24 has turned ON, communication between the control circuit 36 and the battery-control circuit 65 is started. Consequently, the electric-power consumption of the battery 60 can be curtailed more than in the situation in which communication starts merely by the mounting of the battery pack 22 on the work machine 1. In addition, the transmission of the information-request signal from the control circuit 36 to the battery-control circuit 65 is started from a point in time prior to the driving (energization) of the motor 50. Consequently, the drive (energization) of the motor 50 can be started within the electric-power-consumption range in which the protection function of the battery pack 22 does not operate.

(7) When an electric current is not flowing from the battery pack 22 to the motor 50, the state of the battery pack 22 changes significantly less than when an electric current is flowing from the battery pack 22 to the motor 50. Consequently, when electric current is not flowing from the battery pack 22 to the motor 50, the processing load of the control circuit 36 and the battery-control circuit 65 can be reduced by reducing the frequency of the serial communication.

(8) The current-upper-limit value of the discharge current is set based on the protection-counter value, and the discharge current is controlled (limited) such that it becomes the set current-upper-limit value or less. Thereby, because the current-upper-limit value is reduced prior to the protection function of the battery pack 22 operating, the drive of the motor 50 can be continued within the electric-power consumption range in which the protection function of the battery pack 22 does not operate.

Second Embodiment 2-1. Points of Difference from the First Embodiment

Because the basic configuration of a second embodiment is the same as that of the first embodiment, explanations of structural elements that are in common will be omitted, and the second embodiment will be explained focusing on the points of difference. It is noted that symbols that are the same as those in the first embodiment indicate identical structural elements, and preceding explanations will be referenced.

In the first embodiment described above, the battery-control circuit 65 calculates the protection-counter value and transmits the calculated protection-counter value and the counter threshold to the control circuit 36 of the work machine 1 as the battery information. In contrast, the second embodiment differs from the first embodiment in the point that the control circuit 36 receives the counter-map information, the addition threshold, and the subtraction threshold from the battery pack 22 and uses these received items to calculate the protection-counter value.

In addition, in the first embodiment, when the control circuit 36 has detected a sign or warning that the protection function of the battery pack 22 will soon operate (if no current-reducing measure is taken), the control circuit 36 reduces the current-upper-limit value so that the protection-counter value will not exceed the protection threshold. In contrast, in the second embodiment, when the control circuit 36 has detected a sign or warning that the protection function of the battery pack 22 will soon operate (if no current-reducing measure is taken), the control circuit 36 reduces the upper-limit value of the duty ratio in the PWM control so that the protection-counter value will not exceed the protection threshold. That is, in the first embodiment, the discharge-current value is reduced by setting the current-upper-limit value to a value that is smaller than the normal current value. In contrast, in the second embodiment, the discharge-current value is reduced by setting the upper-limit value of duty ratio to a value that is smaller than the normal duty-ratio value.

Figure 5:
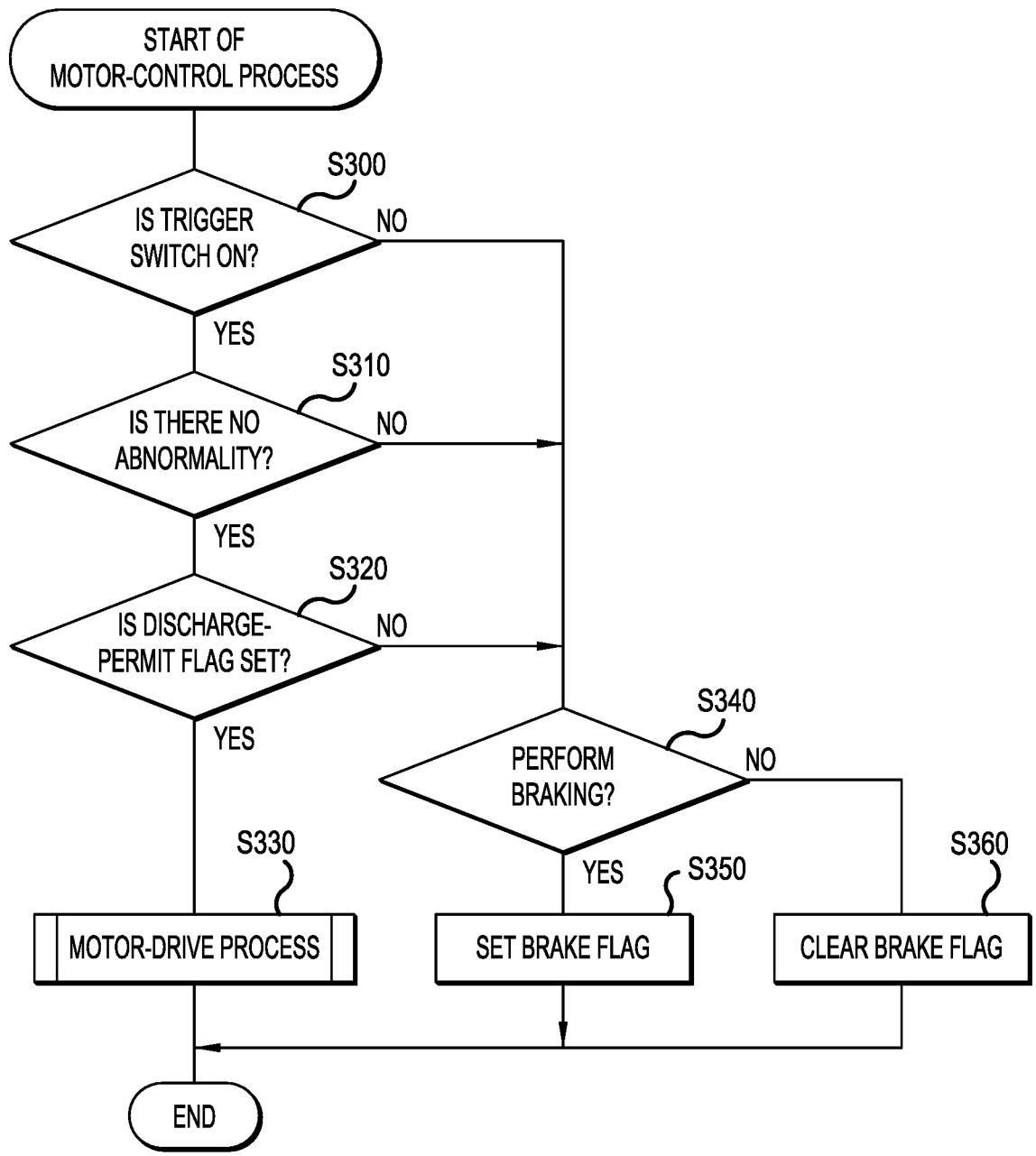
FIG. 5 is a flow chart that shows a motor-control process performed by the control circuit of the work machine according to the first embodiment.

Specifically, in the second embodiment, the motor-drive process in S330 of the motor-control process shown in FIG. 5 differs from that in the first embodiment. In the first embodiment, in the motor-drive process in S330, the control circuit 36 performs the processes described by the flow charts shown in FIG. 6 and FIG. 7. In contrast, in the second embodiment, in the motor-drive process in S330, the control circuit 36 performs the processes described by the flow charts in FIG. 14 to FIG. 16.

2-2. Processes in the Work Machine

<2-2-1. Motor-Drive Process>

Figure 14:
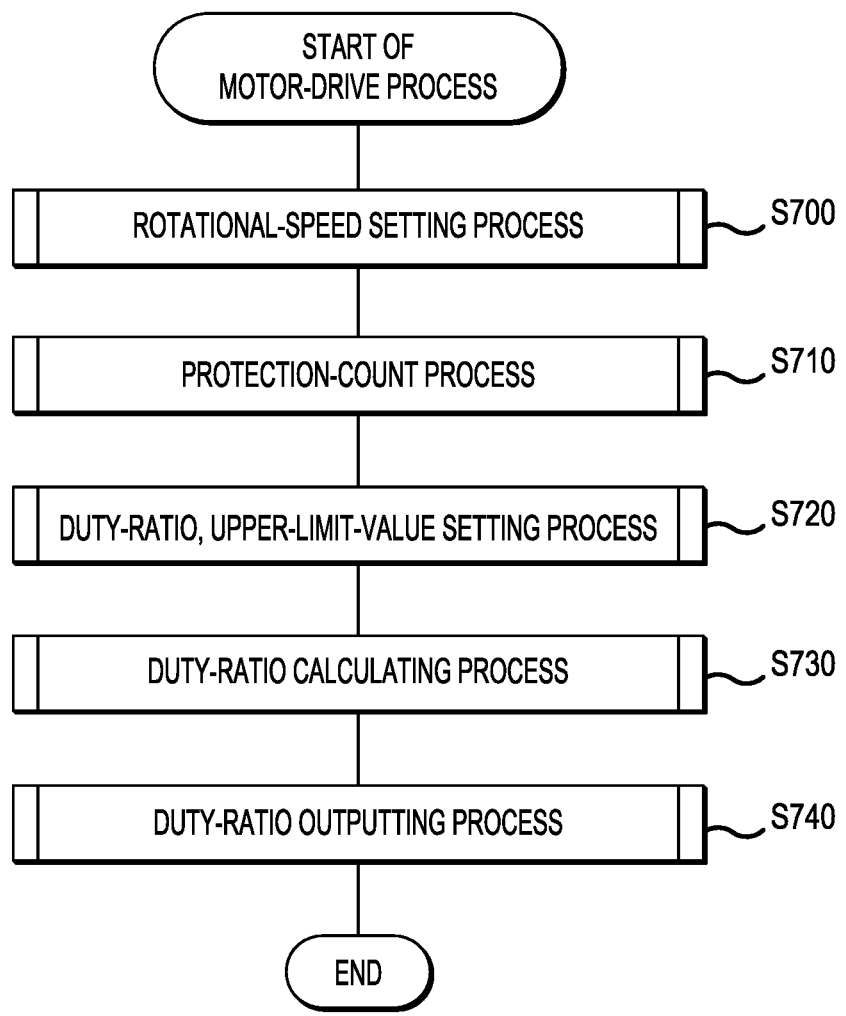
FIG. 14 is a flow chart that shows a motor-drive process performed by the control circuit of the work machine according to a second embodiment.

Next, the details of the motor-drive process, which is performed by the control circuit 36 in S330, will be explained, with reference to the flow chart in FIG. 14.

Figure 6:
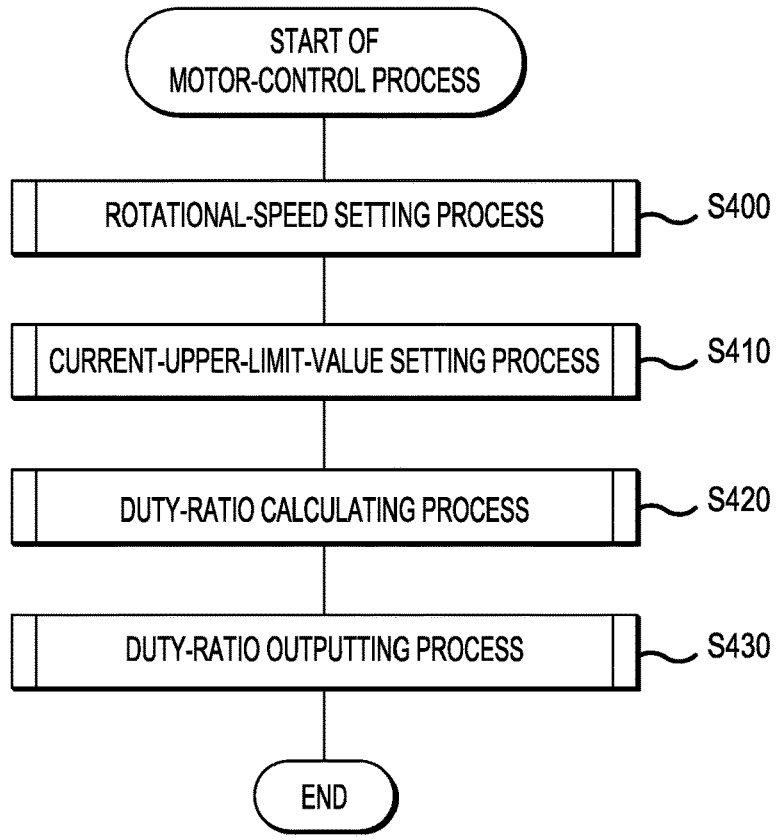
FIG. 6 is a flow chart that shows a motor-drive process performed by the control circuit of the work machine according to the first embodiment.

First, in S700, the control circuit 36 performs the same process as in S400 shown in FIG. 6.

Next, in S710, the control circuit 36 performs a protection-count process, which calculates a protection-counter value. The details of the protection-count process are described below.

Next, in S720, the control circuit 36 performs a duty-ratio, upper-limit-value setting process, which sets an upper-limit value of the duty ratio for use in the PWM control. The details of the duty-ratio, upper-limit-value setting process are described below.

Next, in S730, the control circuit 36 performs the process of calculating the duty ratio for use in the PWM control. Specifically, the control circuit 36 calculates the duty ratio such that Conditions (3) and (4) are met. Condition (3) is that the duty ratio becomes less than or equal to the duty-ratio, upper-limit value of the duty ratio set in S720. Condition (4) is that the rotational speed of the motor 50 converges to the target rotational speed set in S700. In the situation in which both Conditions (3) and (4) cannot be met, the control circuit 36 prioritizes the meeting of Condition (3) and calculates the duty ratio such that, as long as Condition (3) is met, the rotational speed of the motor 50 approaches the target rotational speed as much as possible.

Next, in S740, the control circuit 36 performs the same process as in S430 shown in FIG. 6. The present process ends with the above.

<2-2-2. Protection-Count Process>

Next, the details of the protection-count process, which is performed by the control circuit 36 in S710, will be explained, with reference to the flow chart in FIG. 15.

First, in S800, the control circuit 36 determines whether the discharge-current value detected by the electric-current detecting part 54 is greater than or equal to the addition threshold.

The control circuit 36 proceeds to the process in S810 when the discharge-current value is the addition threshold or greater and proceeds to the process in S830 when the discharge-current value is less than the addition threshold.

Figure 19:
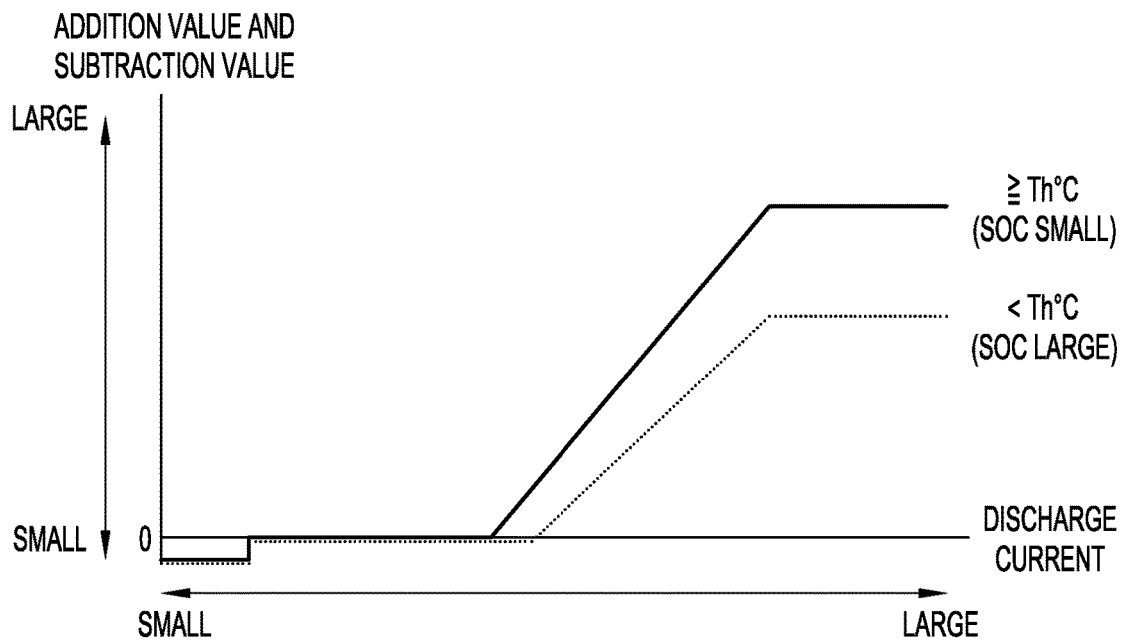
FIG. 19 is a counter map that shows a correspondence relationship between a discharge-current value and an addition value.

In S810, an addition value, which is a positive value, corresponding to the prevailing magnitude of the discharge current is calculated using the received counter map. As shown in FIG. 19, the larger the discharge-current value, the larger the addition value calculated by the control circuit 36. For example, the control circuit 36 calculates an addition value of "1" when the discharge-current value is 50 A and calculates an addition value of "3" when the discharge-current value is 70 A.

Next, in S820, the control circuit 36 updates the protection-counter value by adding the addition value calculated in S810 to the protection-counter value, after which the present process ends.

On the other hand, in S830, the control circuit 36 determines whether the discharge-current value is less than or equal to the subtraction threshold. The subtraction threshold is a value that is smaller than the addition threshold, for example, 5 A. The control circuit 36 proceeds to the process in S840 when the discharge-current value is the subtraction threshold or less and ends the present process when the discharge-current value is greater than the subtraction threshold.

In S840, the control circuit 36 calculates the subtraction value, which is a specified value, from the received counter map and updates the protection-counter value by subtracting the calculated subtraction value from the protection-counter value. The present process ends with the above.

<2-2-3. Duty-Ratio, Upper-Limit-Value Setting Process>

Figure 16:
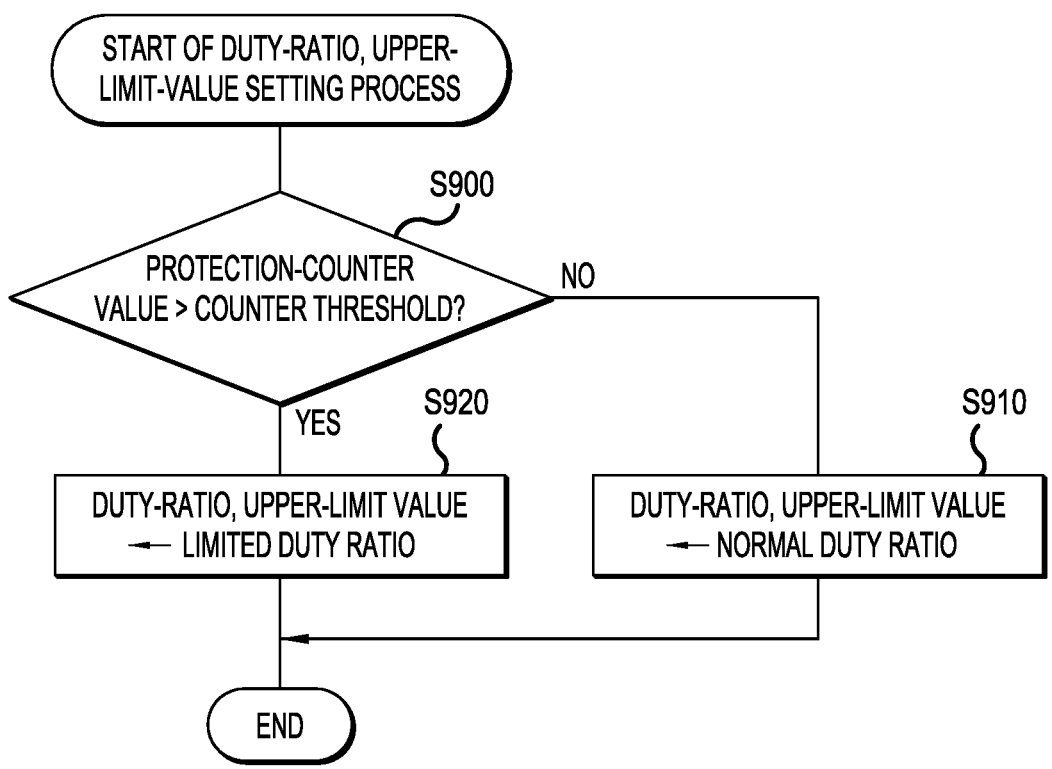
FIG. 16 is a flow chart that shows a duty-ratio, upper-limit-value setting process performed by the control circuit of the work machine according to the second embodiment.

Next, the details of the duty-ratio, upper-limit-value setting process, which is performed by the control circuit 36 in S720, will be explained, with reference to the flow chart in FIG. 16.

First, in S900, the control circuit 36 determines whether the protection-counter value is greater than the counter threshold. The control circuit 36 proceeds to the process in S910 when the protection-counter value is less than or equal to the counter threshold and proceeds to the process in S920 when the protection-counter value is greater than the counter threshold.

In S910, the control circuit 36 sets the duty-ratio, upper-limit value to the normal duty ratio. The normal duty ratio is a duty ratio, for example, 100%, with which the discharge-current value is set to a value that is the addition threshold or greater.

On the other hand, in S920, the control circuit 36 sets the upper-limit value of the duty ratio to a limited (reduced) duty ratio. The limited duty ratio is a duty ratio with which the discharge-current value is set to a value that is less than the addition threshold and is a value that is smaller than the normal duty ratio. The present process ends with the above.

Figure 17:
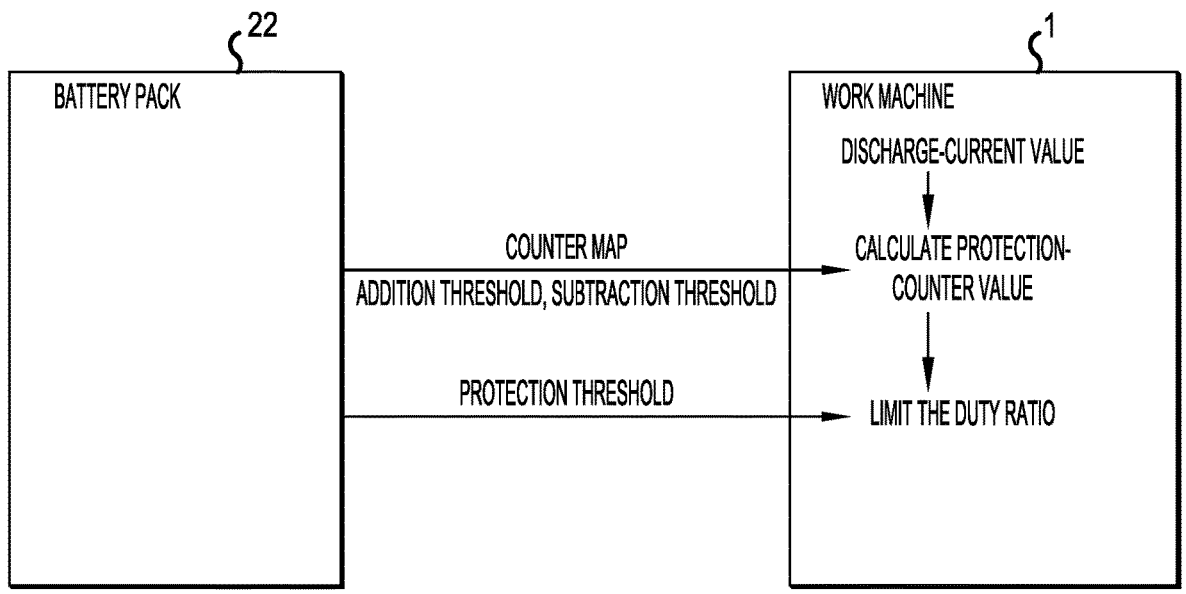
FIG. 17 schematically shows the flow of data between the battery pack and the work machine according to the second embodiment.

FIG. 17 shows an overview of the flow of data between the battery pack 22 and the work machine 1 while the main process according to the present embodiment is being performed. The counter map, the addition threshold, the subtraction threshold, and the protection threshold are transmitted from the battery pack 22 to the work machine 1. In the work machine 1, the protection-counter value is calculated using the discharge-current value and the received counter map, addition threshold, and protection threshold. Then, in the work machine 1, the duty ratio is limited using the calculated protection-counter value and the counter threshold calculated from the received protection threshold.

2-3. Effects

According to the second embodiment as explained above, the effects (1)-(3), (6), and (7) of the first embodiment as well as the following effect (9) are exhibited.

(9) When the protection-counter value has exceeded the counter threshold, the upper-limit value of the duty ratio is reduced, whereby the discharge current is reduced and the supply of power from the battery pack 22 to the motor 50 is reduced. In turn, an increase in the protection-counter value can be restrained, and the operation of the protection function of the battery pack 22 can be restrained (delayed with the possibility of being averted).

Third Embodiment 3-1. Points of Difference from the First Embodiment

Because the basic configuration of a third embodiment is the same as that of the first embodiment, explanations of structural elements that are in common will be omitted, and the third embodiment will be explained focusing on the points of difference. It is noted that symbols that are the same as those in the first embodiment indicate identical structural elements, and preceding explanations will be referenced.

In the first embodiment, the counter threshold is a fixed value. In contrast, the third embodiment differs from the first embodiment in the point in that the counter threshold is a variable value that is set based on the state information received by the control circuit 36 from the battery pack 22.

Specifically, in the third embodiment, the current-upper-limit-value setting process in S410 of the motor-drive process shown in FIG. 6 differs from that in the first embodiment. In the first embodiment, in the current-upper-limit-value setting process in S410, the control circuit 36 performs the process shown in the flow chart in FIG. 7. In contrast, in the third embodiment, in the current-upper-limit-value setting process in S410, the control circuit 36 performs the process described in the flow chart in FIG. 18.

3-2. Current-Upper-Limit-Value Setting Process

Figure 18:
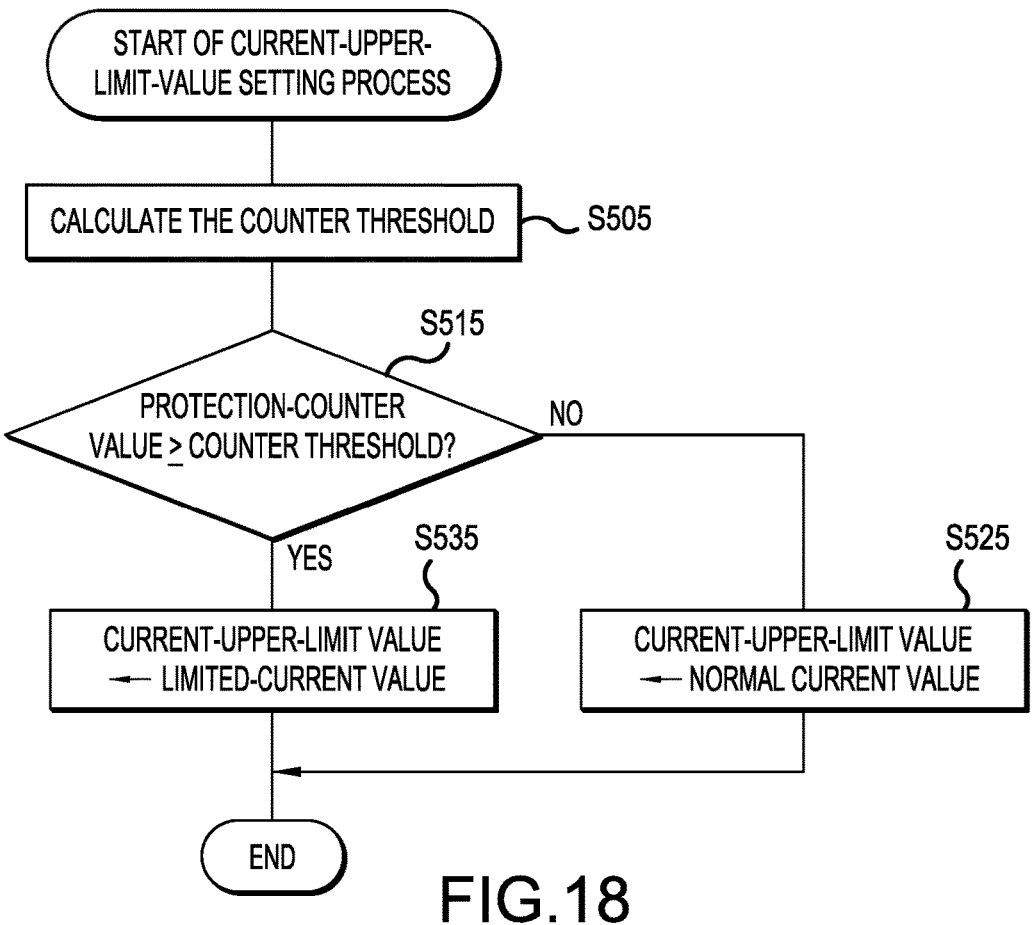
FIG. 18 is a flow chart that shows a current-upper-limit-value setting process performed by the control circuit of the work machine according to a third embodiment.

Next, in the present embodiment, the details of the current-upper-limit-value setting process, which is performed by the control circuit 36 in S410, will be explained, with reference to the flow chart shown in FIG. 18.

First, in S505, the control circuit 36 sets the counter threshold. In greater detail, the control circuit 36 sets the counter threshold based on: the magnitude of the discharge current detected by the electric-current detecting part 54; and the counter-map information received from the battery pack 22. As shown in FIG. 19, the counter-map information indicates (provides) a correspondence relationship between the magnitude of the discharge current on one side and the addition value and the subtraction value on the other side. The addition value herein includes positive values and zero, and the subtraction value has a negative value. The larger the discharge-current value, the larger the addition value, but the subtraction value is a specified value.

The control circuit 36 acquires, using the counter-map information, the addition value corresponding to the detected (prevailing) discharge-current magnitude. Then, the control circuit 36 calculates the rate of increase of the protection-counter value in the situation in which the acquired addition value has been added to the protection-counter value, and the counter threshold is set in accordance with the calculated rate of increase. For example, if the rate of increase is higher than a set rate-of-increase threshold, the control circuit 36 sets the counter threshold to a comparatively small value such that the discharge current is immediately limited; on the other hand, if the rate of increase is the rate-of-increase threshold or below, the control circuit 36 sets the counter threshold to a comparatively large value.

In addition, the battery 60 is more prone to deteriorate when the battery temperature is comparatively high than when the battery temperature is comparatively low even if a discharge current of the same magnitude is flowing in both situations. Therefore, the counter-map information may be differentiated by battery temperature. For example, as shown in FIG. 19, the counter-map information may be differentiated into the case in which the battery temperature is Th° C. or higher and the case in which the battery temperature is less than Th° C. In this embodiment, the control circuit 36 should set the counter threshold based on: the detected (prevailing) discharge-current magnitude; and the (prevailing) battery temperature and the counter-map information received from the battery pack 22.

Furthermore, the battery 60 is more prone deteriorate when the remaining capacity (remaining charge or state of charge (SOC) in FIG. 19) of the battery 60 is comparatively small than when the remaining capacity is comparatively large even if a discharge current of the same magnitude is flowing in both situations. Therefore, the counter-map information may be differentiated by battery temperature and by remaining capacity. In this embodiment, the control circuit 36 should set the counter threshold based on: the detected (prevailing) discharge-current magnitude; and the (prevailing) battery temperature, the (prevailing) remaining capacity (SOC), and the counter-map information received from the battery pack 22.

Figure 7:
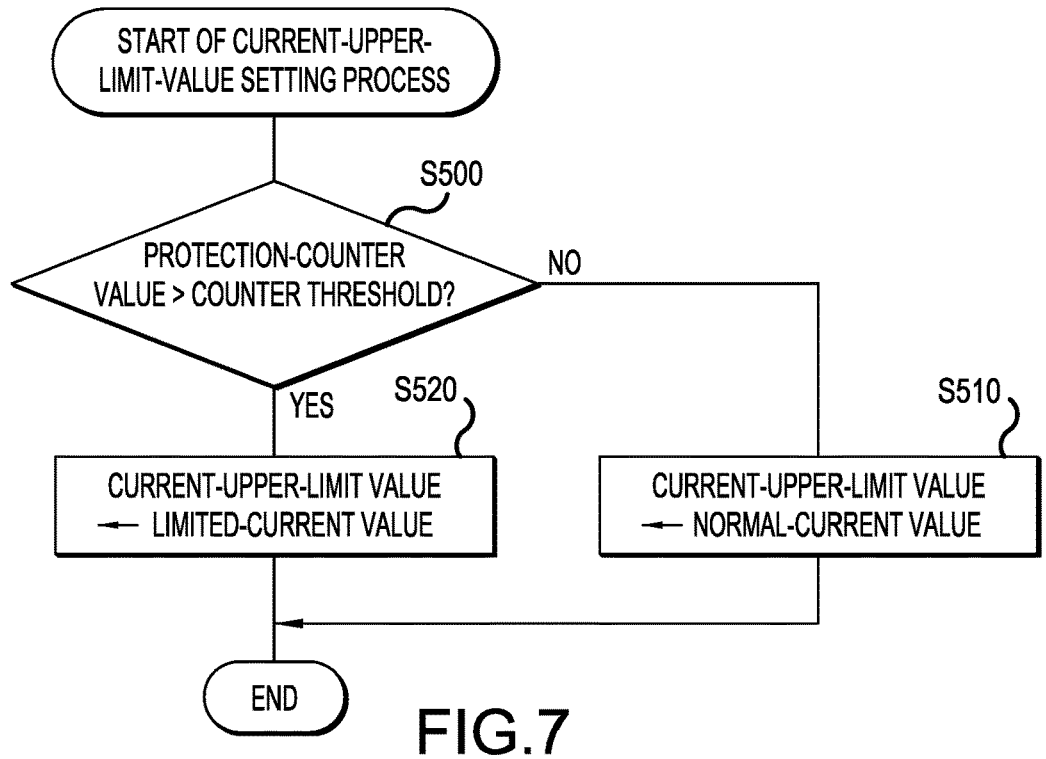
FIG. 7 is a flow chart that shows a current-upper-limit-value setting process performed by the control circuit of the work machine according to the first embodiment.

Next, in the processes of S515-S535, the control circuit 36 performs the same processes as in S500-S520 shown in FIG. 7.

Figure 20:
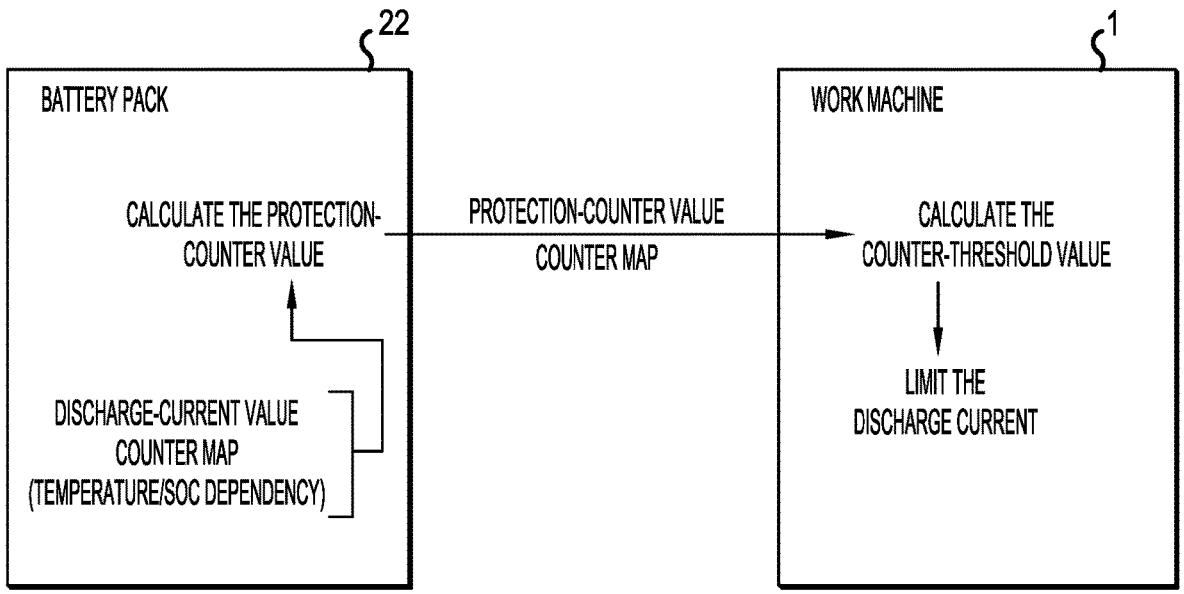
FIG. 20 schematically shows the flow of data between the battery pack and the work machine according to the third embodiment.

FIG. 20 shows an overview of the flow of data between the battery pack 22 and the work machine 1 while the main process according to the present embodiment is being performed. In the battery pack 22, the protection-counter value is calculated from the discharge-current value and the counter map. The counter map may be a map that is in accordance with battery temperature and/or remaining capacity.

Then, the calculated protection-counter value and the counter map are transmitted from the battery pack 22 to the work machine 1. In the work machine 1, the counter threshold is calculated from the received protection-counter value and counter map. Furthermore, in the work machine 1, the discharge current is limited using the received protection-counter value and the calculated counter threshold.

3-3. Effects

According to the third embodiment as explained above, the effects (1)-(8) of the first embodiment along with the following effect (10) are exhibited.

(10) The control circuit 36 can cause the counter threshold to change in accordance with the magnitude of the discharge current by using the counter-map information. In turn, the supply of power can be suitably limited in accordance with the magnitude of the discharge current. In particular, the control circuit 36 can more suitably limit the supplied electric power in an embodiment in which the counter-map information is differentiated by battery temperature and/or by remaining capacity.

Fourth Embodiment 4-1. Points of Difference from the First Embodiment

Because the basic configuration of a fourth embodiment is the same as that of the first embodiment, explanations of structural elements that are in common will be omitted, and the fourth embodiment will be explained focusing on the points of difference. It is noted that symbols that are the same as those in the first embodiment indicate identical structural elements, and preceding explanations will be referenced.

In the first embodiment described above, the battery-control circuit 65 calculates the protection-counter value and transmits the calculated protection-counter value and the counter threshold as the battery information to the control circuit 36 of the work machine 1. In contrast, in the fourth embodiment, the protection-counter value and the counter map are transmitted from the battery-control circuit 65 to the control circuit 36. Then, the control circuit 36 receives the protection-counter value from the battery-control circuit 36 and itself calculates the protection-counter value at a cycle shorter than the cycle at which the protection-counter value is received.

Figure 4:
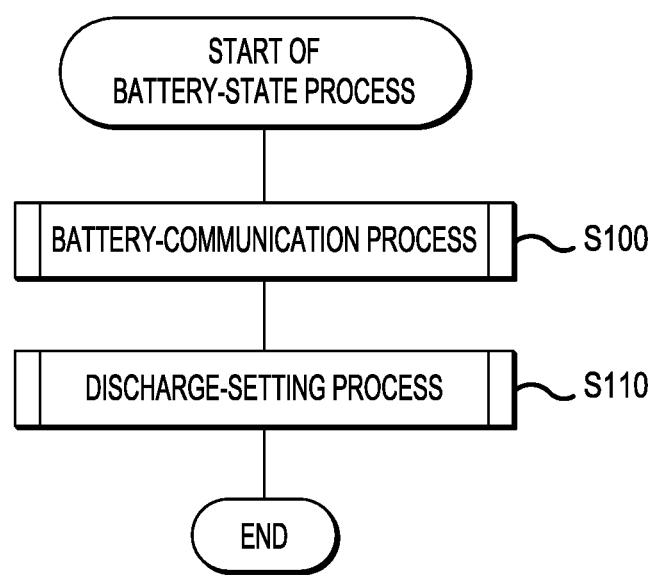
FIG. 4 is a flow chart that shows a battery-state process performed by the control circuit of the work machine according to the first embodiment.
Figure 21:
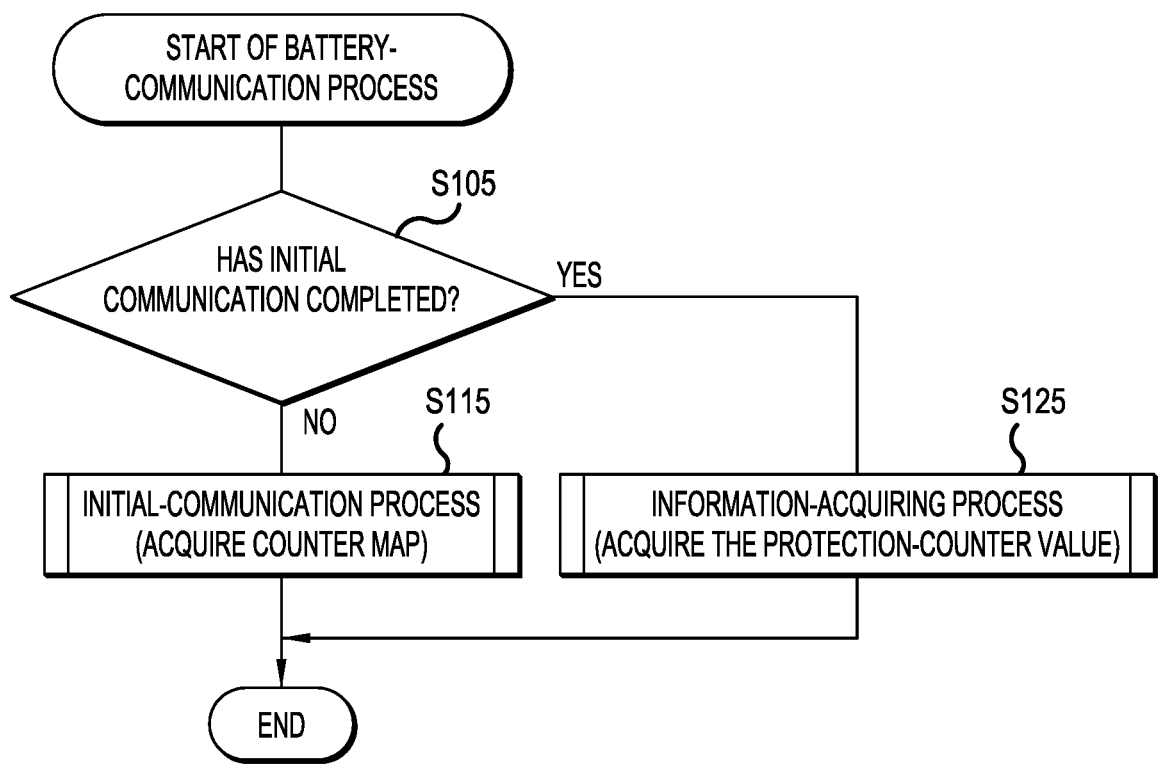
FIG. 21 is a flow chart that shows a battery-communication process performed by the control circuit of the work machine according to a fourth embodiment.
Figure 22:
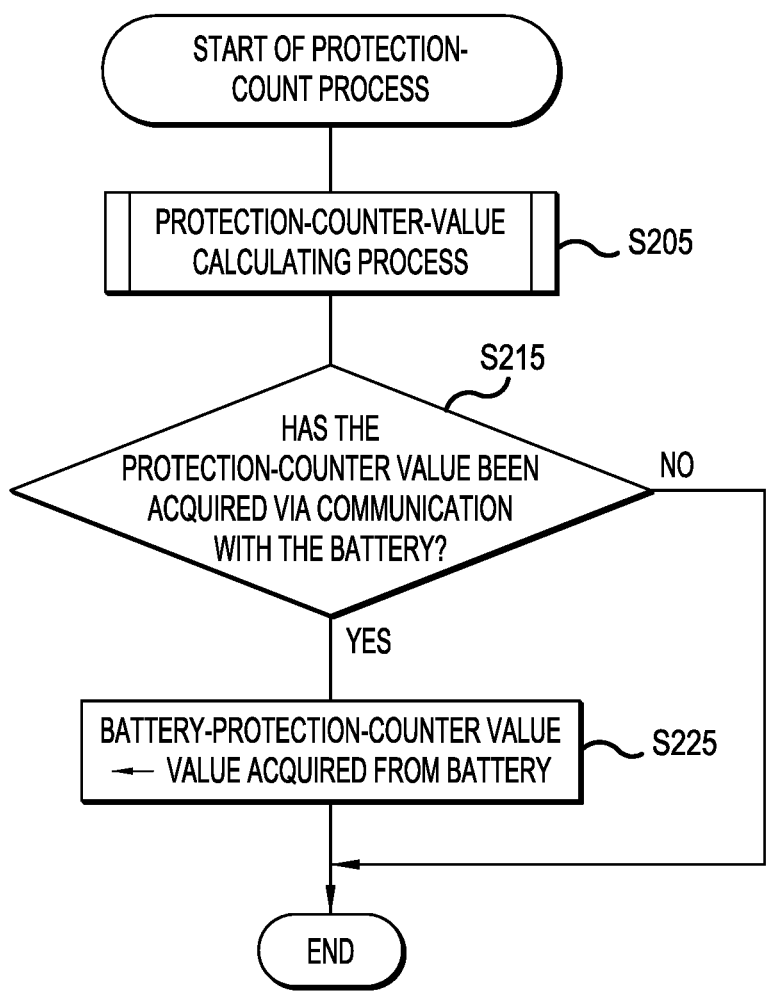
FIG. 22 is a flow chart that shows the protection-count process performed by the control circuit of the work machine according to the fourth embodiment.
Figure 24:
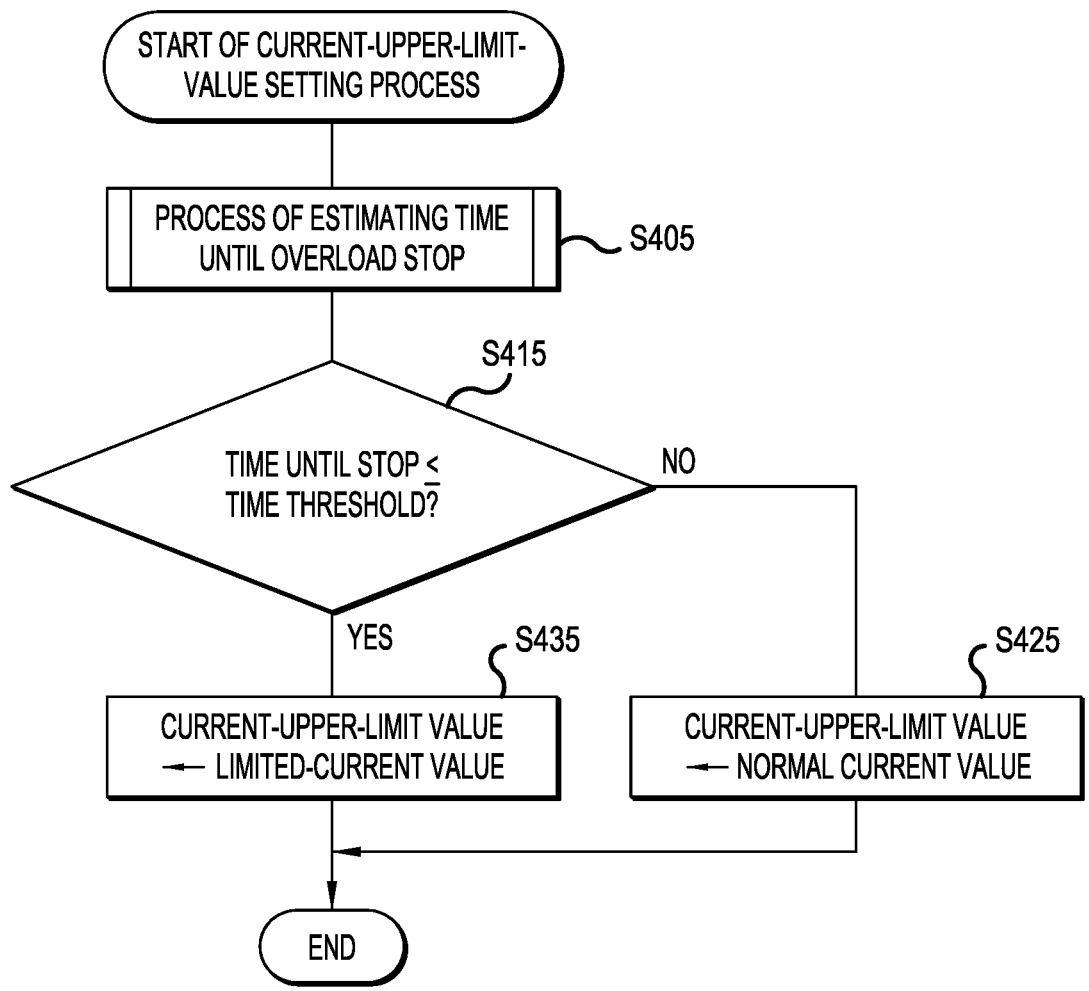
FIG. 24 is a flow chart that shows the current-upper-limit-value setting process according to the fourth embodiment.
Figures 25, 26:
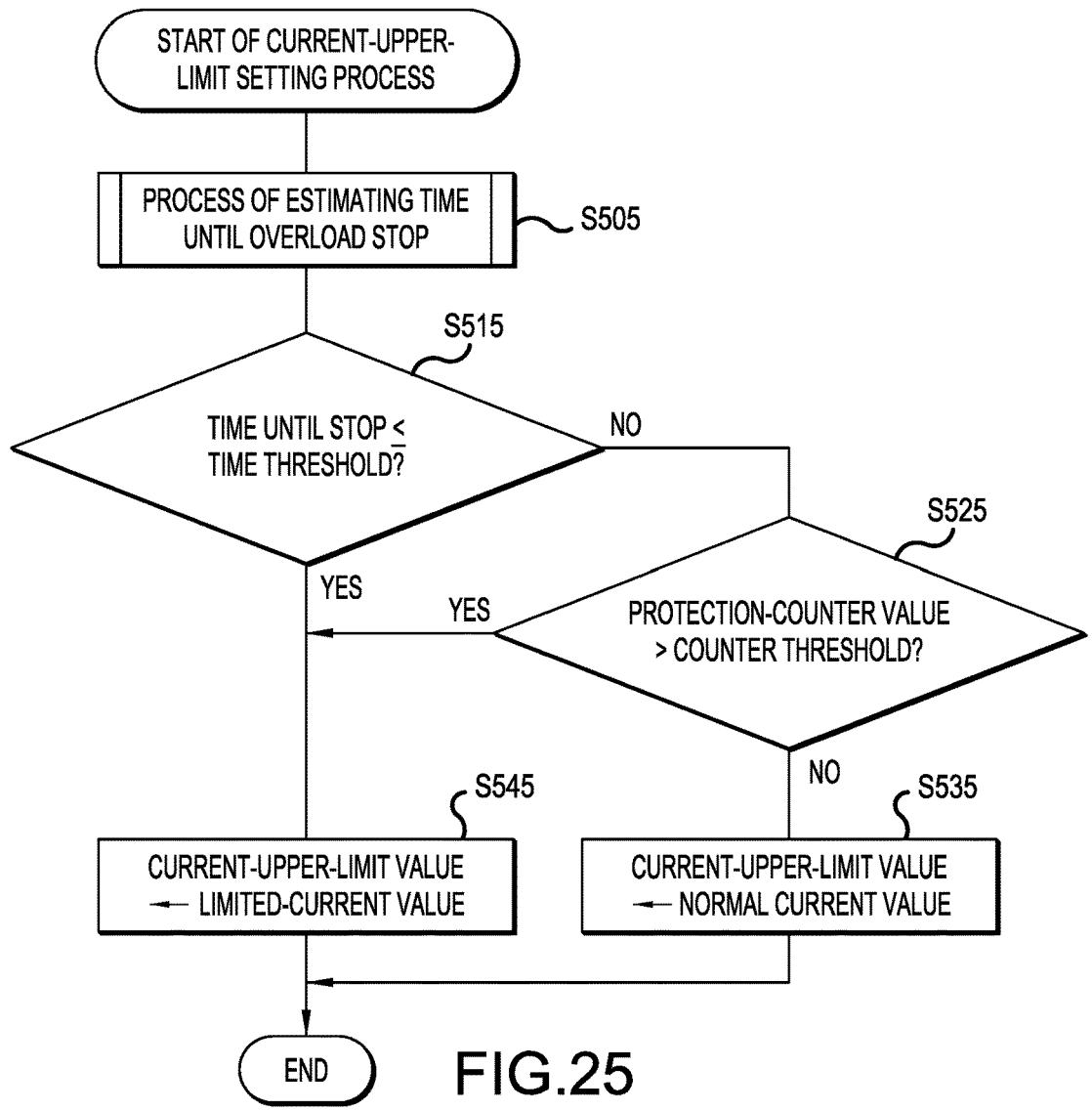
FIG. 25 is a flow chart that shows a separate example of the current-upper-limit-value setting process according to the fourth embodiment.
FIG. 26 is a counter map that is transmitted from the battery pack to the work machine according to the fourth embodiment.

Specifically, in the fourth embodiment, the battery-communication process in S100 of the battery-state process shown in FIG. 4 differs from that in the first embodiment. In the fourth embodiment, in the battery-communication process in S100, the control circuit 36 performs the process described in the flow chart in FIG. 21. In addition, between the processes in S400 and S410 of the motor-drive process shown in FIG. 6, the protection-count process shown in FIG. 22 is performed. Furthermore, in the current-upper-limit-value setting process in S410 of the motor-drive process shown in FIG. 6, the processes described in the flow charts in FIG. 24 and FIG. 25 are performed.

4-2. Processes in the Work Machine

<4-2-1. Battery-Communication Process>

Next, the details of the battery-communication process, which is performed by the control circuit 36 in S100, will be explained, with reference to the flow chart in FIG. 21.

In S105, the control circuit 36 determines whether the initial communication has been completed. In S105, if it has been determined that the initial communication has not been completed, it proceeds to the process in S115; on the other hand, if it has been determined that the initial communication has been completed, it proceeds to the process in S125.

In S115, the control circuit 36 performs an initial-communication process. Specifically, the control circuit 36 receives, from the battery-control circuit 65, the counter map, the addition threshold, the subtraction threshold, the protection threshold, the counter threshold, and a time threshold, which is described below. FIG. 26 shows one example of the counter map. This counter map may be a counter map that is in accordance with battery temperature and/or remaining capacity. On the other hand, in S125, the protection-counter value calculated by the battery-control circuit 65 is received.

It is noted that the control circuit 36 may receive the counter map, etc. from the battery-control circuit 65 at a timing other than in the first communication when the work machine 1 and the battery pack 22 are connected together. For example, the control circuit 36 may receive the counter map, etc. from the battery-control circuit 65 when, after the supply of electric power from the battery pack 22 stops and the work machine 1 has stopped, the work machine 1 has restarted by once again receiving a supply of electric power.

<4-2-2. Protection-Count Process>

Next, the details of the protection-count process, which is performed by the control circuit 36 between the processes in S400 and S410, will be explained, with reference to the flow chart in FIG. 22.

First, in S205, a protection-counter-value calculating process is performed to calculate the protection-counter value. The details of the process of calculating the protection-counter value are described below.

Next, in S215, the control circuit 36 determines, by communicating with the battery pack 22, whether the protection-counter value of the present time has been acquired. The protection-counter value of the present time is, for example, the protection-counter value in the interval between the current cycle of the protection-count process and a point in time going back by a prescribed interval from the current cycle of the protection-count process. Alternatively, the current protection-counter value is the protection-counter value in the interval between the previous cycle of the protection-count process and the current cycle of the protection-count process. Because the cycle of the battery-communication process described above is longer than the cycle of the protection-count process, there are situations in which the protection-counter value can be acquired from the battery pack 22 between cycles of the protection-count process, and there are situations in which such cannot be acquired.

In S215, if it has been determined that the protection-counter value has been acquired, it proceeds to the process in S225; on the other hand, if it has been determined that the protection-counter value has not been acquired, the present process ends.

In S225, the control circuit 36 updates the protection-counter value of the battery, which the control circuit 36 has, to the protection-counter value acquired from the battery pack 22, after which the present process ends. That is, when the protection-counter value of the present time has been acquired from the battery pack 22, the control circuit 36 prioritizes the protection-counter value acquired from the battery pack 22 over the protection-counter value calculated by the control circuit 36 and uses such. In addition, when the protection-counter value of the present time has not been acquired from the battery pack 22, the control circuit 36 uses the protection-counter value calculated by the control circuit 36.

<4-2-3. Protection-Counter-Value Calculating Process>

Figure 23:
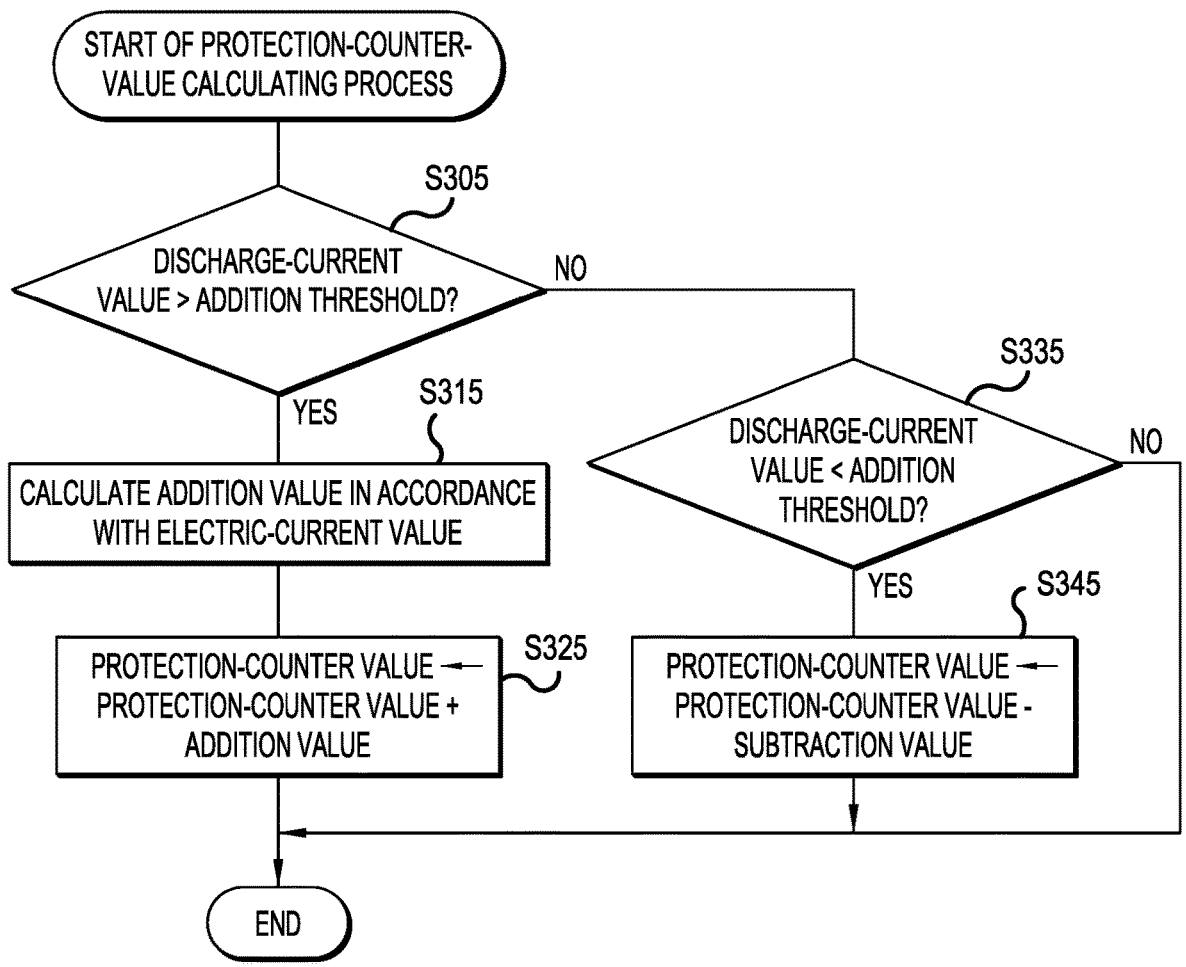
FIG. 23 is a flow chart that shows a protection-counter-value calculating process performed by the control circuit of the work machine according to the fourth embodiment.

Next, the details of the protection-counter-value calculating process, which is performed by the control circuit 36 in S205, will be explained, with reference to the flow chart in FIG. 23.

Figure 15:
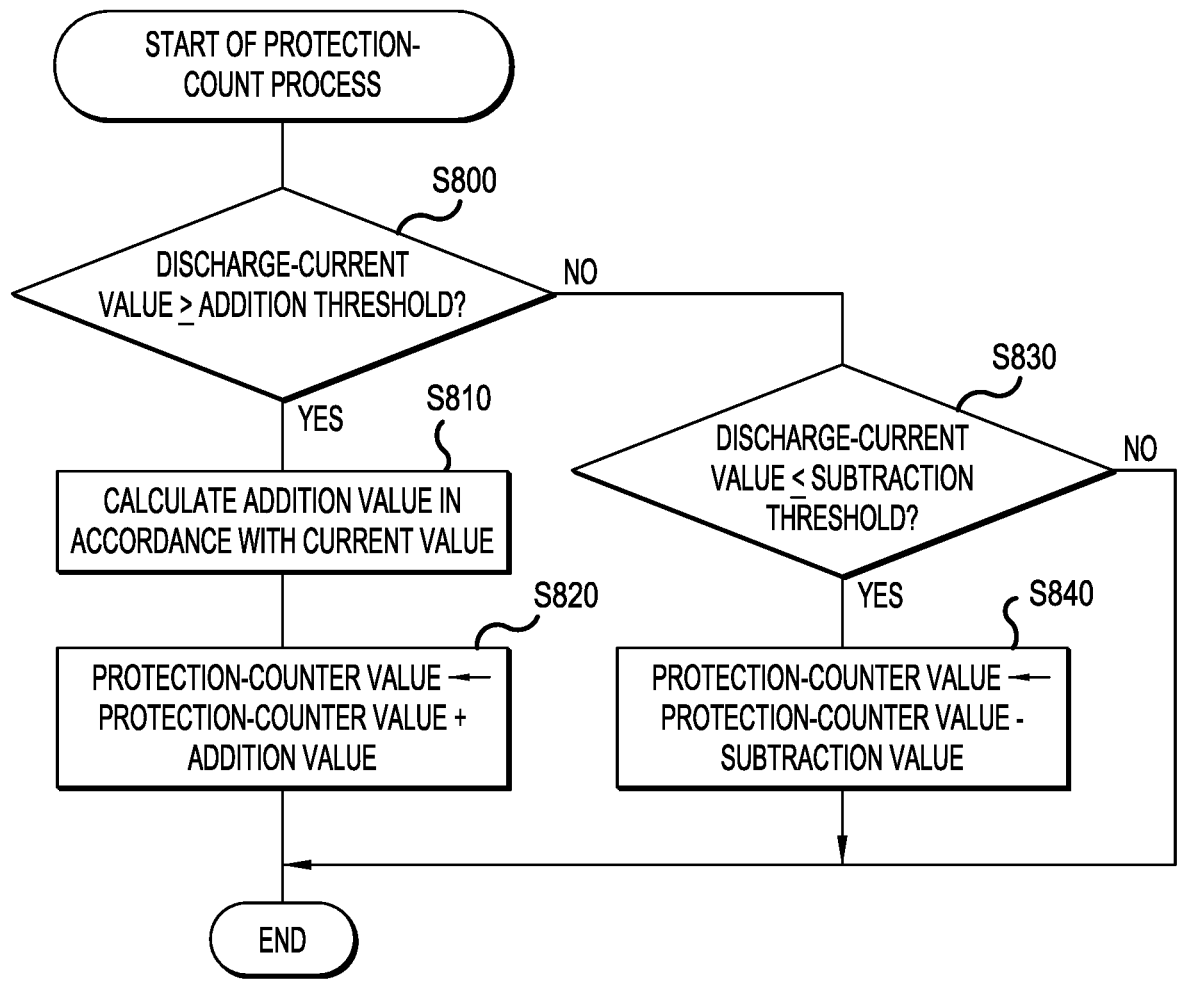
FIG. 15 is a flow chart that shows a protection-count process performed by the control circuit of the work machine according to the second embodiment.

First, in S305-S345, the same processes as in S800-S840 shown in FIG. 15 are performed. That is, in S325 and S345, the protection-counter value is updated to the value obtained by adding an addition value to the protection-counter value or is updated to the value obtained by subtracting the subtraction value from the protection-counter value.

At this time, the protection-counter value before the updating is the value calculated in the previous cycle of the calculating process of the protection-counter process or is the protection-counter value that has been updated to the value acquired from battery pack 22 in S225. Accordingly, the control circuit 36 performs the battery-communication process to acquire the protection-counter value from the battery-control circuit 65. Then, the control circuit 36 calculates the protection-counter value of the present time by cumulating (adding up), between cycles of the battery-communication process, the addition value and the subtraction value in the protection-counter value acquired from the battery-control circuit 65 via the most-recent communication.

<4-2-4. Current-Upper-Limit-Value Setting Process>

Next, the details of the current-upper-limit-value setting process, which is performed by the control circuit 36 in S410, will be explained, with reference to the flow chart in FIG. 24.

In S405, the control circuit 36 performs a process of estimating the time until the battery pack 22 will be stopped due to an overload. If the protection-counter value has reached the protection threshold, the battery pack 22 outputs a discharge-prohibit signal because of the overload and enters the discharging-stopped state. The control circuit 36 uses the received counter map to estimate the time until the protection-counter value will reach the protection threshold.

In S415, the control circuit 36 determines whether the time until stoppage that was estimated in S405 is less than a time threshold. In S415, if it has been determined that the time until stoppage is greater than or equal to the time threshold, it proceeds to the process in S425; on the other hand, if it has been determined that the time until stoppage is less than the time threshold, it proceeds to the process in S435. That is, based on the comparison of the time until stoppage and the time threshold, when a sign or warning has been detected that the battery pack 22 will perform the protection operation, the control circuit 36 proceeds to the process in S435; on the other hand, when a sign or warning is not detected, the control circuit 36 proceeds to the process in S425.

In S425, the control circuit 36 sets the current-upper-limit value to the normal current value. The normal current value is an electric-current value that is greater than or equal to the addition threshold. That is, the normal current value is a value that will cause the protection-counter value to be increased.

On the other hand, in S435, the control circuit 36 sets the current-upper-limit value to the limited-current value. The limited-current value may be an electric-current value that is less than the addition threshold. That is, the limited-current value may be a value that holds the protection-counter value below a specified value.

Figure 27:
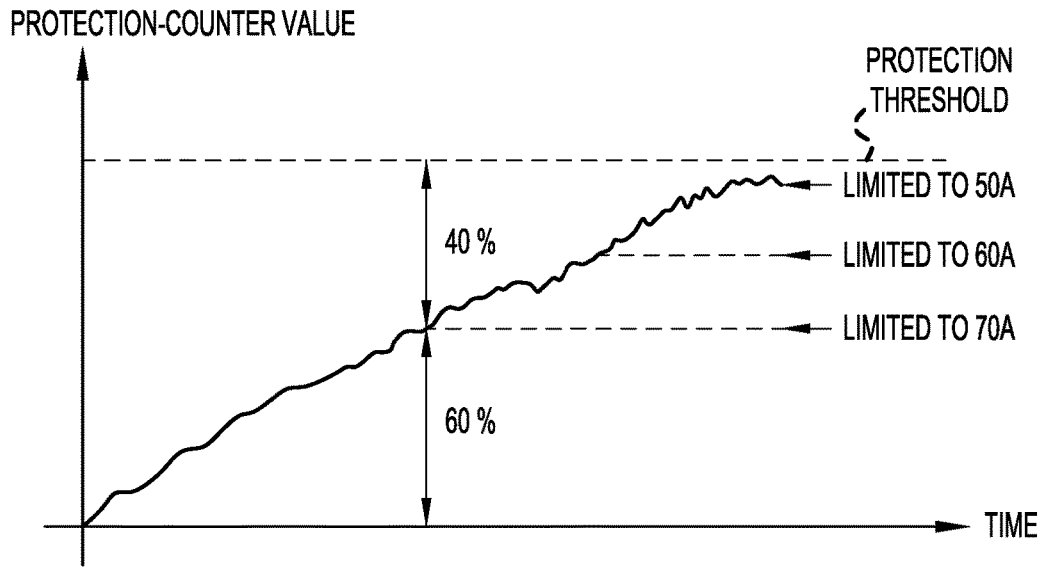
FIG. 27 shows the change in a limited-current value relative to the protection-counter value according to the fourth embodiment.

Alternatively, as shown in FIG. 27, the electric-current limit value (limited-current value) may be a value that is set in accordance with the protection-counter value. For example, as shown in FIGS. 26 and 27, if the protection-counter value is a value that is 60% of the protection threshold, the electric-current limit value is set to 70 A so as to limit the addition value to 2 or less. Thereafter, if the protection-counter value has increased to a value that is 80% of the protection threshold, the electric-current limit value is set to 60 A so as to limit the addition value to 1 or less. Thereafter, if the protection-counter value has increased to a value that is 90% of the protection threshold, the electric-current limit value is set to 50 A so as to limit the addition value to 0 or less. That is, the discharge current is not suddenly limited to a value whereby the addition value becomes 0 or less, but rather the discharge current is limited (gradually reduced) such that the increase in the protection-counter value is gradual. However, just before the protection-counter value reaches the protection threshold, the discharge current may be limited to a value that does not cause the protection-counter value to increase. In so doing, compared with an embodiment in which the discharge current is suddenly limited to a value whereby the addition value becomes 0 or less, the user can continue use of the work machine with as little decrease in the output in the work machine as possible.

<4-2-5. Separate Example of Current-Upper-Limit-Value Setting Process>

Next, the details of a separate example of the current-upper-limit-value setting process, which is performed by the control circuit 36 in S410, will be explained, with reference to the flow chart in FIG. 25.

In S505, S515, and S545, the same processes as in S405-S435 are performed.

Then, in S515, if it has been determined that the time until stoppage is greater than or equal to the time threshold, it proceeds to the process in S525. In S525, the control circuit 36 determines whether the protection-counter value is greater than the counter threshold. In S525, if it has been determined that the protection-counter value is greater than the counter threshold, it proceeds to the process in S545, where the current-upper-limit value is set to the limited-current value.

On the other hand, in S525, if it has been determined that the protection-counter value is the counter threshold or less, it proceeds to the process in S535, where the current-upper-limit value is set to the normal current value. That is, in a separate example of the current-upper-limit-value setting process, a sign or warning that the battery pack 22 will perform the protection operation is detected based on a comparison of the time until stoppage and the time threshold and on a comparison of the protection-counter value and the counter threshold.

Figure 28:
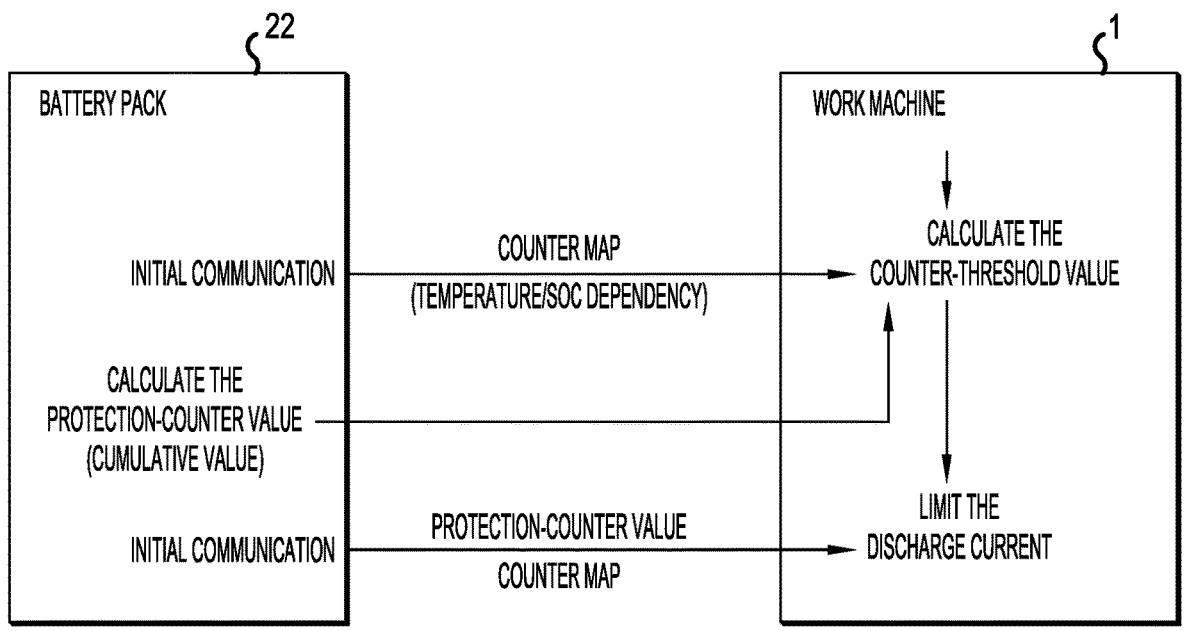
FIG. 28 schematically shows the flow of data between the battery pack and the work machine according to the fourth embodiment.

FIG. 28 shows an overview of the flow of data between the battery pack 22 and the work machine 1 while the main process according to the present embodiment is being performed. In the initial communication, the counter map, the addition threshold, the subtraction threshold, the protection threshold, and the time threshold are transmitted from the battery pack 22 to the work machine 1. In addition, in the battery pack 22, the protection-counter value is calculated, and the calculated protection-counter value is transmitted to the work machine 1 at a prescribed cycle.

At the work machine 1, the protection-counter value of the present time is calculated from the received protection-counter value, the counter map, and the discharge-current value. Then, in the work machine 1, the discharge current is limited using the calculated protection-counter value of the present time and the time threshold. Alternatively, in the work machine 1, the discharge current is limited using the calculated protection-counter value of the present time, the time threshold, and a counter value that is calculated from the received protection threshold.

4-3. Effects

According to the fourth embodiment as explained above, the effects (1)-(8) of the first embodiment as well as the following effects (11)-(12) are exhibited.

(11) If the control circuit 36 has acquired the protection-counter value of the present time from the battery pack 22, the protection-counter value acquired from the battery pack 22 is prioritized over the protection-counter value calculated by the control circuit 36, and such is used. Accordingly, because the control circuit 36 uses, as much as possible, the same value as the value used by the battery pack 22 to perform the protection operation, the control circuit 36 can detect, with good accuracy, a sign or warning that the battery pack 22 will perform the protection operation.

(12) The control circuit 36 calculates the protection-counter value by adding an addition value to or subtracting the subtraction value from the previous protection-counter value acquired from the battery pack 22. Accordingly, because the value used by the battery pack to perform the protection operation is used as much as possible, the control circuit 36 can detect, with good accuracy, a sign or warning that the battery pack 22 will perform the protection operation.

Fifth Embodiment 5-1. Points of Difference from the First Embodiment

Because the basic configuration of a fifth embodiment is the same as that of the first embodiment, explanations of structural elements that are in common will be omitted, and the fourth embodiment will be explained focusing on the points of difference. It is noted that symbols that are the same as those in the first embodiment indicate identical structural elements, and preceding explanations will be referenced.

In the first embodiment described above, when a sign or warning has been detected that the protection operation will be performed by the battery pack 22 (if no current-limiting measure is taken), the control circuit 36 curtails the discharge current, thereby curtailing the advance to an overloaded state of the battery pack 22. In contrast, the fifth embodiment differs from the first embodiment in the point that, when a sign or warning has been detected that the protection operation will be performed by the battery pack 22 (if no current-limiting measure is taken), the control circuit 36 temporarily stops the motor 50 to accelerate the recovery of the battery pack 22. In the fifth embodiment, the control circuit 36 performs an overload-stop process, which is described in the flow chart in FIG. 29, instead of the current-upper-limit-value setting process in S410.

As shown in the counter maps in FIG. 19 and FIG. 26, when the motor 50 stops and the discharge current becomes 0 A, the subtraction value is subtracted from the protection-counter value, and thereby the protection-counter value is reduced. After the protection-counter value has been reduced to a prescribed value, the motor 50 is caused to restart, and thereby the stop time of the work machine 1 is curtailed to a comparatively short time compared with an embodiment in which the battery pack 22 has performed the protection operation. When the battery pack 22 performs the protection operation and outputs a discharge-prohibit signal, the stop interval of the motor 50 is, for example, 3-5 min. In contrast, when the work machine 1 stops the motor 50 before the protection operation is performed by the battery pack 22, the stop interval of the motor 50 is, for example, 20-30 sec.

5-2. Overload-Stop Process

Figure 29:
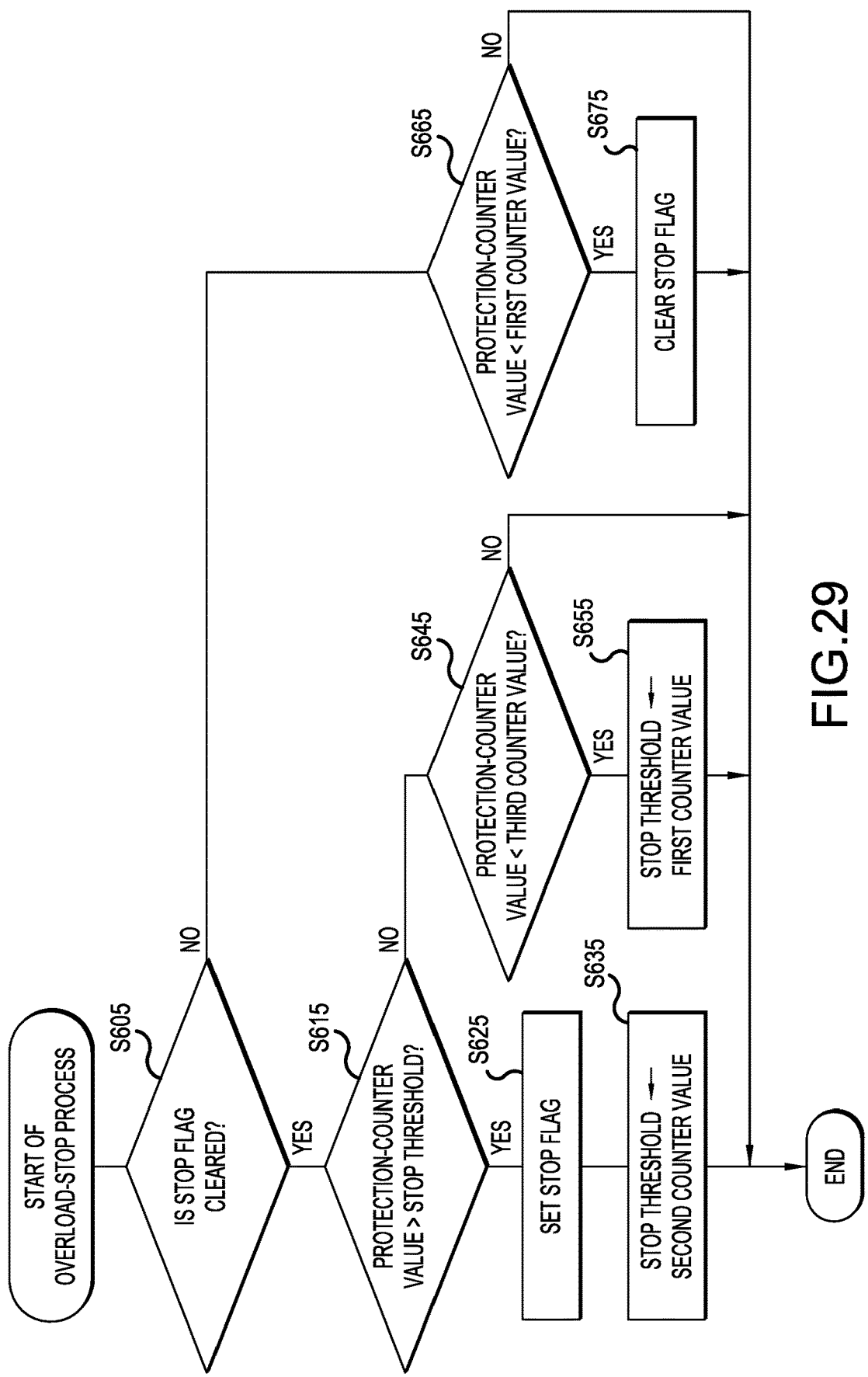
FIG. 29 is a flow chart that shows a protection-counter stop process performed by the control circuit of the work machine according to a fifth embodiment.

Next, the details of the overload-stop process, which is performed—instead of the current-upper-limit-value setting process in S410—by the control circuit 36, will be explained, with reference to the flow chart shown in FIG. 29.

First, in S605, the control circuit 36 determines whether a stop flag is cleared. If the stop flag is set, the control circuit 36 detects an abnormality in the process in S50. As a result, the supply of electric power from the battery 60 to the motor 50 is stopped, and thereby the motor 50 stops.

In S605, if it has been determined that the stop flag is cleared, it proceeds to the process in S615. In S615, the control circuit 36 determines whether the protection-counter value is greater than the set stop threshold. In S615, if it has been determined that the protection-counter value is greater than the stop threshold, it proceeds to the process in S625; on the other hand, if it has been determined that the protection-counter value is less than or equal to the stop threshold, it proceeds to the process in S645.

In S625, the control circuit 36 sets the stop flag. Next, in S635, the control circuit 36 sets the stop threshold to a second counter value, after which the present process ends. The second counter value is a value that is smaller than the protection threshold at which the battery pack 22 performs the protection operation. In the present embodiment, the second counter value corresponds to one example of a second stop threshold.

On the other hand, in S645, the control circuit 36 determines whether the protection-counter value is smaller than a third counter value. The third counter value is a value that is smaller than the second counter value. In S645, if it has been determined that the protection-counter value is smaller than the third counter value, it proceeds to the process in S655; on the other hand, if it has been determined that the protection-counter value is greater than or equal to the third counter value, the present process ends.

In S655, the control circuit 36 sets the stop threshold to a first counter value, after which the present process ends. The first counter value is a value that is smaller than the second counter value and larger than the third counter value. In the present embodiment, the first counter value corresponds to one example of a first stop threshold.

In addition, in S605, if it has been determined that the stop flag is set, it proceeds to the process in S665. In S665, the control circuit 36 determines whether the protection-counter value is smaller than the first counter value. In S665, if it has been determined that the protection-counter value is smaller than the first counter value, it proceeds to S675; on the other hand, if it has been determined that the protection-counter value is greater than or equal to the first counter value, the present process ends. In S675, the control circuit 36 clears the stop flag, after which the present process ends.

5-3. Operation of Work Machine

Figure 30:
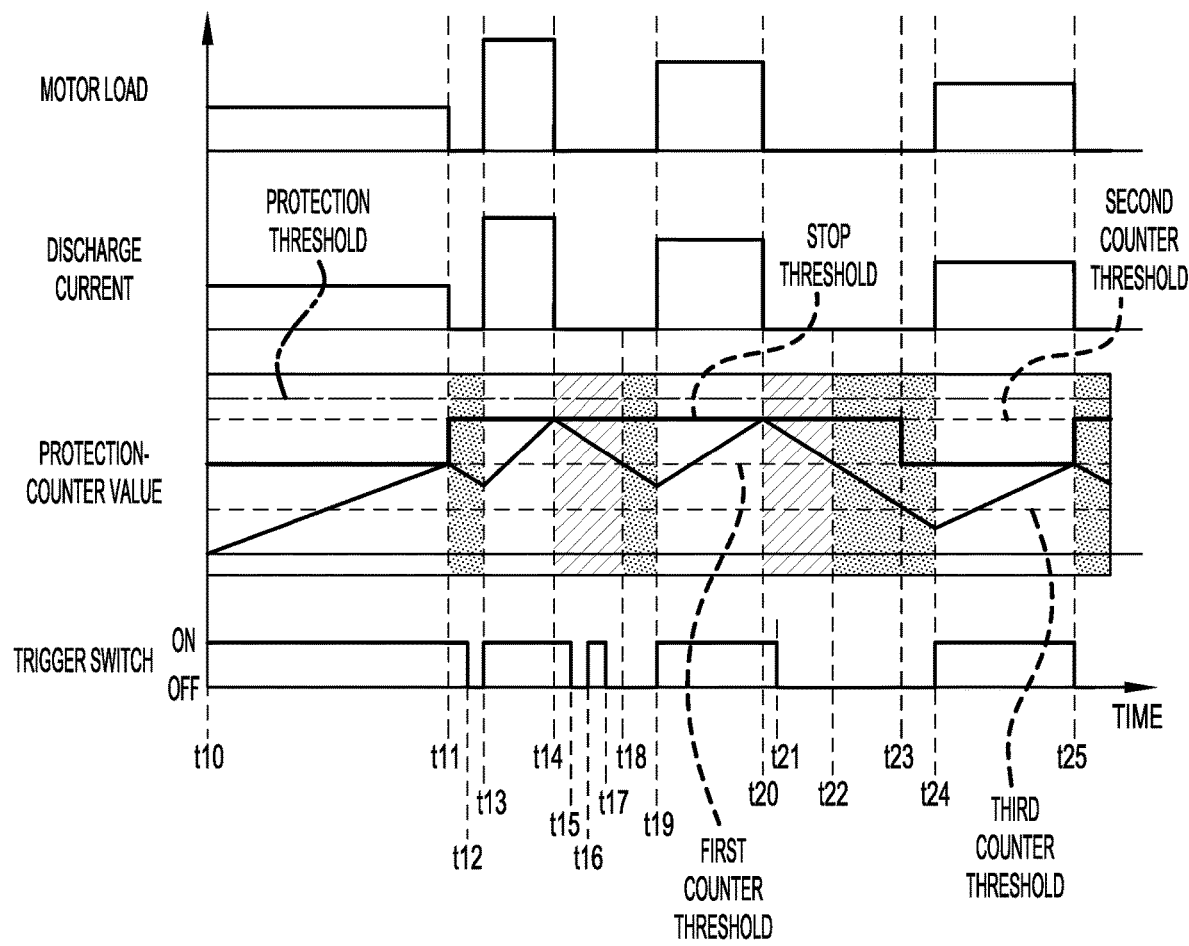
FIG. 30 is a time chart of the motor load, the discharge current, the protection-counter value, and the trigger switch according to the fifth embodiment.

Next, the operation of the work machine 1 in an embodiment in which the control circuit 36 performs the above-described overload-stop process will be explained, with reference to the time chart in FIG. 30. In the time chart of the protection-counter value shown in FIG. 30, the hatched portions indicate stop intervals of the motor 50. In addition, of the hatched portions, the dotted hatched portions indicate intervals during which restarting of the motor 50 is possible by the pulling of the trigger 11, and the diagonally lined hatched portions indicate intervals during which restarting of the motor 50 is prohibited, regardless of whether the trigger 11 is manipulated.

At the point in time t10, the trigger 11 is pulled and the trigger switch 12 is turned ON, whereupon a discharge current that is greater than or equal to the addition threshold flows, and the protection-counter value begins to increase. At this time, the stop threshold is set to the first counter value.

At the point in time t11, when the protection-counter value exceeds the stop threshold (=first counter value), the stop threshold is set to the second counter value. In addition, the motor 50 temporarily stops, and the motor 50 enters the restart-permitted interval. Owing to the stoppage of the motor 50, the discharge current no longer flows, and consequently the protection-counter value begins to decrease.

Then, at the point in time t12, the trigger 11 is released and the trigger switch 12 temporarily turns OFF; at the point in time t13, when the trigger 11 is pulled and the trigger switch 12 turns ON, the motor 50 restarts, and the discharge current flows again.

Then, at the point in time t14, when the protection-counter value exceeds the stop threshold (=second counter value), the motor 50 stops, and the motor 50 enters the restart-prohibited interval. In the interval from the point in time t13 to the point in time t14, the load of the motor 50 is larger than in the interval from the point in time t10 to the point in time t11, and the discharge-current value becomes large. Consequently, in the interval from the point in time t13 to the point in time t14, the rate of increase of the protection-counter value becomes larger than in the interval from the point in time t10 to the point in time t11.

In addition, at the point in time t14, when the motor 50 stops, the protection-counter value begins to decrease. At the point in time t15, the trigger 11 is released and thereby the trigger switch 12 turns OFF; at the point in time t16, the trigger 11 is pulled and thereby the trigger switch 12 turns ON. Nevertheless, because the motor 50 is in the restart-prohibited interval, the motor 50 is maintained in the stopped state, and no discharge current will flow. At the point in time t11, when the motor 50 temporarily stops but the user continues use of the work machine 1 at the point in time t13, the user can recognize that the restart-prohibited interval of the motor 50 is expected to be imposed soon.

At the point in time t17, the trigger 11 is released and thereby the trigger switch 12 turns OFF. At the point in time t18, the protection-counter value becomes equal to or less than the first counter value, and thereby the motor 50 transitions from the restart-prohibited interval to a new restart-permitted interval.

Then, at the point in time t19, when the trigger 11 is pulled and thereby the trigger switch 12 turns ON, the motor 50 restarts, and the discharge current flows again. At the point in time t20, when the protection-counter value once again exceeds the stop threshold (=second counter value), the motor 50 stops and enters a new restart-prohibited interval.

In the interval from the point in time t19 to the point in time t20, the load on the motor 50 is smaller than in the interval from the point in time t13 to the point in time t14, and thereby the discharge-current value is smaller. Consequently, in the interval from the point in time t19 to the point in time t20, the rate of increase of the protection-counter value is smaller than in the interval from the point in time t13 to the point in time t14.

In addition, at the point in time t20, when the motor 50 stops, the protection-counter value begins to decrease. At the point in time t21, the trigger 11 is released and thereby the trigger switch 12 turns OFF. At the point in time t22, the protection-counter value becomes equal to or less than the first counter value, and the motor 50 transitions from the restart-prohibited interval to a new restart-permitted interval. Nevertheless, because the trigger 11 is not pulled, the motor 50 does not restart, and the protection-counter value continues to decrease.

Then, at the point in time t23, when the protection-counter value becomes less than the third counter value, the stop threshold is set to the first counter value. At the point in time t24, when the trigger 11 is pulled and thereby the trigger switch 12 turns ON, the motor 50 restarts and the discharge current begins to flow. In addition, the protection-counter value begins to increase. At the point in time t25, when the protection-counter value exceeds the stop threshold (=first counter value), the motor 50 stops and enters the restart-permitted interval. In the present embodiment, because the discharge current is not being limited, the discharge current changes in accordance with the change in the load of the motor 50 over the entire interval.

5-4. Effects

According to the fifth embodiment as explained above, the following effects (13)-(15) are exhibited.

(13) Before the protection operation is performed by the battery pack 22, the control circuit 36 stops the motor 50. Thereby, the battery pack 22 can be caused to recover in a comparatively shorter time than in the situation in which the battery pack 22 performs the protection operation. In turn, the user can continue usage of the work machine 1 through the comparatively short stop interval of the work machine 1. In addition, the user can continue usage of the work machine 1 in the state in which the output of the battery pack 22 is not being limited.

(14) When the protection-counter value exceeds the stop threshold, which is smaller than the protection threshold, the motor 50 is stopped. Thereby, the protection-counter value decreases. As a result, the battery pack 22 can be caused to recover during the comparatively short stop interval of the motor 50. In turn, after the comparatively short stop interval, the motor 50 can continue to receive the supply of electric power from the battery pack 22.

(15) When the protection-counter value has exceeded the stop threshold set to the first counter value, the motor 50 is stopped; then, when the trigger 11 is manipulated after the stopping of the motor 50, the motor 50 is restarted. Furthermore, when the protection-counter value has exceeded the stop threshold set to the second counter value, the motor 50 is stopped, and the restarting of the motor 50 is prohibited until the protection-counter value falls below the first counter value. Thereby, when the motor 50 has been temporarily stopped, the user can continue usage of the work machine 1 by manipulating the trigger 11 and, by continuing such usage, can recognize that a usage-prohibited interval of the work machine 1 is expected to be imposed soon.

Other Embodiments

Modes (embodiments) for carrying out the present disclosure were explained above, but the present disclosure is not limited to the embodiments described above, and various modifications can be effected.

(a) In each of the above-mentioned embodiments, when the protection-counter value has exceeded the protection threshold, the protection function of the battery pack 22 operates, but the present disclosure is not limited thereto. For example, when the remaining capacity of the battery 60 falls below a first capacity threshold, the protection function of the battery pack 22 may operate. That is, when the battery pack 22 has entered an over-discharged state, the protection function may operate, and thereby discharging may be prohibited.

Furthermore, when the remaining capacity acquired from the battery pack 22 has fallen below a second capacity threshold, the control circuit 36 may set the current-upper-limit value to the limited-current value. Alternatively, when the acquired remaining capacity has fallen below the second capacity threshold, the control circuit 36 may set the upper-limit value of the duty ratio to the limited duty ratio. The second capacity threshold is a value that is greater than the first capacity threshold. In such an embodiment, when the remaining capacity has fallen below the second capacity threshold, the control circuit 36 detects a sign or warning that the protection function will operate soon unless a current-limiting measure is taken.

(b) In addition, when the battery temperature has exceeded a first temperature threshold, the protection function of the battery pack 22 may operate. That is, when the battery pack 22 has entered a high-temperature state, the protection function may operate, and thereby discharging may be prohibited.

Furthermore, when the battery temperature acquired from the battery pack 22 has exceeded a second temperature threshold, the current-upper-limit value may be set to the limited-current value. Alternatively, when the acquired battery temperature has exceeded the second temperature threshold, the control circuit 36 may set the upper-limit value of the duty ratio to the limited duty ratio. The second temperature threshold is a value that is lower than the first temperature threshold. In this embodiment, when the battery temperature has exceeded the second temperature threshold, the control circuit 36 detects a sign or warning that the protection function will operate soon unless a current-limiting measure is taken.

(c) In the first embodiment, when the protection-counter value is less than or equal to the counter threshold, the upper-limit value of the current is set to the normal current value; however, when the protection-counter value is less than or equal to the counter threshold, it is not necessary to set an upper-limit value of the current. In this embodiment, in the process in S420, the control circuit 36 should calculate the duty ratio such that Condition (2) is met.

(d) In the first embodiment, the current-upper-limit value is set to either value of two steps but may be set to any value of three or more steps. For example, a first counter threshold and a second counter threshold, which is smaller than the first counter threshold, are set as thresholds that are smaller than the protection threshold. Then, when the protection-counter value is smaller than the second counter threshold, the control circuit 36 sets the upper-limit value of the current to the normal current value. In addition, when the protection-counter value is the first counter threshold or greater, the control circuit 36 sets the upper-limit value of the current to a first limited-current value; however, when the protection-counter value is less than the first counter threshold but is greater than or equal to the second counter threshold, the control circuit 36 sets the upper-limit value of the current to a second limited-current value. The first current-limit value and the second current-limit value are each a value that is smaller than the addition threshold, and the first current-limit value is a value that is smaller than the second current-limit value. Likewise, in the second embodiment, the upper-limit value of the duty ratio may be set to any value of three or more steps.

(e) The first embodiment and the second embodiment may be combined. Specifically, in the first embodiment, the control circuit 36 of the work machine 1 may calculate the protection-counter value instead of receiving the protection-counter value from the battery-control circuit 65, as in the second embodiment. In this embodiment, the battery-control circuit 65 does not have to calculate the protection-counter value.

In addition, in the second embodiment, the battery-control circuit 65 may calculate the protection-counter value, as in the first embodiment. In this embodiment, instead of calculating the protection-counter value, the control circuit 36 of the work machine 1 may receive the protection-counter value, the addition threshold, and the subtraction threshold from the battery-control circuit 65.

(f) In the third embodiment, the control circuit 36 sets the counter threshold in the process in S505 based on the magnitude or the like of the discharge current and the counter-map information; however, the control circuit 36 may set the limited-current value based on the magnitude or the like of the discharge current and the counter-map information. For example, if the rate of increase of the protection-counter value estimated from the counter-map information is comparatively large, the control circuit 36 may set the limited-current value to a comparatively small value; on the other hand, if the rate of increase of the protection-counter value is comparatively small, the control circuit 36 may set the limited-current value to a comparatively large value.

(g) In each of the above-mentioned embodiments, the number of communication wires constituting each of the second connection wire 49 and the second battery-connection wire 69 is not limited to one and may be two. In the situation in which the second connection wire 49 and the second battery-connection wire 69 each comprises two communication wires, one of the communication wires is a transmit-dedicated wire that transmits data from the control circuit 36 to the battery-control circuit 65, and the other communication wire is a transmit-dedicated wire that transmits data from the battery-control circuit 65 to the control circuit 36. In the situation in which the second connection wire 49 and the second battery-connection wire 69 each comprises two communication wires, the serial terminal 44 and the battery serial terminal 64 each comprises two terminals for serial communication. Then, the two communication wires are respectively connected to the two terminals for serial communication. Thus, in the situation in which the second connection wire 49 and the second battery-connection wire 69 each comprises two communication wires, the communication speed between the control circuit 36 and the battery-control circuit 65 can be made higher than in the situation in which they each comprise only one communication wire. Even in so doing, the electric power supplied from the battery pack 22 to the motor 50 can be suitably limited.

(h) The present disclosure is not limited to being applied to a grass trimmer and is applicable to a variety of work machines that are configured such that a work tool is driven by a rotational force, for example, power tools such as chain saws, hedge trimmers, clippers, impact drivers, and the like.

(i) The control circuit 36 and the battery-control circuit 65 may comprise: a combination of various individual electronic parts instead of or in addition to a microcomputer; an application specific integrated circuit (ASIC); an application-specific standard product (ASSP); a programmable-logic device such as, for example, a field-programmable gate array (FPGA); or a combination of these.

(j) A plurality of functions having a single structural element in the embodiments above may be implemented by a plurality of structural elements, and a single function having a single structural element may be implemented by a plurality of structural elements. In addition, a plurality of functions having a plurality of structural elements may be implemented by a single structural element, and a single function implemented by a plurality of structural elements may be implemented by a single structural element. In addition, a portion of the configuration of each embodiment above may be omitted. In addition, at least a portion of the configuration of each embodiment above may be supplemented or substituted by the configuration of other embodiments above.

(k) In addition to the electric work machine described above, the present disclosure can also be implemented in a variety of configurations such as a system, a motor-driving method, or the like, in which the electric work machine and the battery pack serve as structural elements.

The invention claimed is:

1. An electric work machine that operates by receiving electric power from a battery pack configured to perform a protection operation in response to the battery pack having become overloaded, the electric work machine comprising:
    a motor configured to be energized by the electric power from the battery pack;
    a manipulatable part; and
    a control part configured to:
        control energization of the motor so as to start the motor in response to the manipulatable part having been manipulated,
        acquire state information concerning a discharge state of the battery pack, and
        take measures based on the acquired state information to restrain the
    performance of the protection operation by the battery pack;
    wherein:
    the state information includes a cumulative value, which is the cumulation of addition values, each being in accordance with a value of a discharge current supplied from the battery pack to the motor, that is used by the battery pack to determine whether to perform the protection operation;
    the battery pack is configured to perform the protection operation in response to the cumulative value having exceeded a protection threshold; and
    the control part is configured to control the energization of the motor using the cumulative value as a battery-protection value, and to change a control parameter for controlling the energization of the motor concerning an amount of electric power supplied to the motor so as to limit the amount of electric power supplied to the motor in response to the battery-protection value having exceeded a limit threshold, which is smaller than the protection threshold.

2. The electric work machine according to claim 1, wherein the control part is configured to change, based on the state information and before the protection operation is performed by the battery pack, the control parameter for controlling the energization of the motor concerning the amount of electric power supplied to the motor.

3. The electric work machine according to claim 2, wherein the state information includes information concerning a sign or warning that the battery pack will perform the protection operation.

4. The electric work machine according to claim 2, wherein:

the control parameter includes a value of a discharge current that will flow from the battery pack to the motor; and the control part is configured to limit the value of the discharge current based on the state information.

5. The electric work machine according to claim 1, wherein:

the control part is configured to perform pulse-width modulation (PWM) control of the motor; and the control parameter includes a duty ratio for use in the PWM control.

6. The electric work machine according to claim 1, wherein the control part is configured to acquire a stored value of the state information before energizing the motor and to set the control parameter based on the stored value of the state information before energizing the motor.

7. The electric work machine according to claim 1, wherein the control part is configured to stop the motor, based on the state information, before the protection operation is performed by the battery pack.

8. An electric work machine that operates by receiving electric power from a battery pack configured to perform a protection operation in response to the battery pack having become overloaded, the electric work machine comprising:

a motor configured to be energized by the electric power from the battery pack;

a manipulatable part; and a control part configured to:

control energization of the motor so as to start the motor in response to the manipulatable part having been manipulated, acquire state information concerning a discharge state of the battery pack, and take measures based on the acquired state information to restrain the performance of the protection operation by the battery pack;

wherein:

the state information includes map information for calculating a cumulative value used by the battery pack to determine whether to perform the protection operation;

the control part is configured to detect discharging-related values concerning discharging, calculate a battery-protection value from the detected discharging-related values and the map information, and control the energization of the motor using the calculated battery-protection value; and the battery-protection value is a value that corresponds to the cumulative value calculated by the battery pack cumulating addition values, each being in accordance with the discharging-related value in the map information.

9. The electric work machine according to claim 8, wherein the discharging-related values are values of the discharge current that flows from the battery pack to the electric work machine.

10. The electric work machine according to claim 8, wherein:

the state information includes the cumulative value; and the control part is configured to set the battery-protection value to the cumulative value acquired from the battery pack in response to the cumulative value having been acquired from the battery pack.

11. The electric work machine according to claim 10, wherein the control part is configured to calculate the battery-protection value by adding the addition values in accordance with the discharging-related values detected in the map information to a previous cumulative value acquired from the battery pack.

12. An electric work machine that operates by receiving electric power from a battery pack configured to perform a protection operation in response to the battery pack having become overloaded, the electric work machine comprising:

a motor configured to be energized by the electric power from the battery pack;

a manipulatable part; and a control part configured to:

control energization of the motor so as to start the motor in response to the manipulatable part having been manipulated, acquire state information concerning a discharge state of the battery pack, and take measures based on the acquired state information to restrain the performance of the protection operation by the battery pack;

wherein:

the state information includes a remaining capacity of the battery pack;

the battery pack is configured to perform the protection operation in response to the remaining capacity having fallen below a first capacity threshold; and the control part is configured to change a control parameter for controlling the energization of the motor concerning an amount of electric power supplied to the motor so as to limit the amount of electric power supplied to the motor in response to the remaining capacity having fallen below a second capacity threshold, which is greater than the first capacity threshold.

13. An electric work machine that operates by receiving electric power from a battery pack configured to perform a protection operation in response to the battery pack having become overloaded, the electric work machine comprising:

a motor configured to be energized by the electric power from the battery pack;

a manipulatable part; and a control part configured to:

control energization of the motor so as to start the motor in response to the manipulatable part having been manipulated, acquire state information concerning a discharge state of the battery pack, and take measures based on the acquired state information to restrain the performance of the protection operation by the battery pack;

wherein:

the state information includes a battery temperature of the battery pack;

the battery pack is configured to perform the protection operation in response to the battery temperature having exceeded a first temperature threshold; and the control part changes a control parameter for controlling the energization of the motor concerning an amount of electric power supplied to the motor so as to limit the amount of electric power supplied to the motor in response to the battery temperature having exceeded a second temperature threshold, which is lower than the first temperature threshold.

14. The electric work machine according to claim 1, further comprising:

a main-power-supply switch for supplying electric power to the control part; and wherein the control part is configured to start requesting a stored value of the state information from the battery pack from the point in time after the main-power-supply switch has been turned ON and before energizing the motor.

15. The electric work machine according to claim 1, wherein:
the control part is configured to:
acquire the state information transmitted from the battery pack in accordance with a serial communication protocol; and
set a frequency of the serial communication when electric current is flowing from the battery pack to the motor to be higher than the frequency of the serial communication when electric current is not flowing from the battery pack to the motor.

16. The electric work machine according to claim 1, wherein the control part is configured to:
set, based on the acquired state information, as the control parameter a current-upper-limit value for the discharge current that flows from the battery pack to the motor, and
limit the value of the discharge current to the set current-upper-limit value or less.

17. The electric work machine according to claim 16, wherein:
the battery pack is configured to:
increase a protection-counter value in response to the value of the discharge current being an addition threshold or greater,
maintain or decrease the protection-counter value in response to the value of the discharge current being less than the addition threshold, and
perform the protection operation in response to the protection-counter value having exceeded the protection threshold;
the control part is configured to change the current-upper-limit value from a first upper-limit value to a second upper-limit value, in response to a first event having occurred;
the first upper-limit value is the addition threshold or greater; and
the second upper-limit value is less than the addition threshold.

18. The electric work machine according to claim 17, wherein the first event is the protection-counter value exceeding a counter threshold, which is smaller than the protection threshold.

19. The electric work machine according to claim 18, wherein the protection operation prohibits further supply of the discharge current from the battery pack to the electric work machine.

20. The electric work machine according to claim 1, wherein the protection operation prohibits further supply of the discharge current from the battery pack to the electric work machine.

21. An electric work machine that operates by receiving electric power from a battery pack configured to perform a protection operation in response to the battery pack having become overloaded, the electric work machine comprising:
a motor configured to be energized by the electric power from the battery pack;
a manipulatable part; and
a control part configured to:
control energization of the motor so as to start the motor in response to the manipulatable part having been manipulated,
acquire state information concerning a discharge state of the battery pack, and
take measures based on the acquired state information to restrain the
performance of the protection operation by the battery pack;
wherein:
the state information includes:
a cumulative value, which is the cumulation of addition values, each being in accordance with a value of a discharge current supplied from the battery pack to the motor, that is used by the battery pack to determine whether to perform the protection operation, and
map information that indicates a correspondence relationship between the values of the discharge current that flows from the battery pack to the motor and the addition values;
the battery pack is configured to perform the protection operation in response to the cumulative value having exceeded a protection threshold; and
the control part is further configured to:
control the energization of the motor using the cumulative value as a battery-protection value;
detect the discharge current;
estimate—from the battery-protection value, the detected discharge-current value, and the map information—a time until the battery pack will perform the protection operation; and
in response to the estimated time being shorter than a time threshold, change a control parameter for controlling the energization of the motor concerning an amount of electric power supplied to the motor so as to limit the amount of electric power supplied to the motor.

22. An electric work machine that operates by receiving electric power from a battery pack configured to perform a protection operation in response to the battery pack having become overloaded, the electric work machine comprising:
a motor configured to be energized by the electric power from the battery pack;
a manipulatable part; and
a control part configured to:
control energization of the motor so as to start the motor in response to the manipulatable part having been manipulated,
acquire state information concerning a discharge state of the battery pack, and
take measures based on the acquired state information to restrain the
performance of the protection operation by the battery pack;
wherein:
the state information includes a cumulative value, which is the cumulation of addition values, each being in accordance with a value of a discharge current supplied from the battery pack to the motor, that is used by the battery pack to determine whether to perform the protection operation;
the battery pack is configured to perform the protection operation in response to the cumulative value having exceeded a protection threshold; and
the control part is configured to: control the energization of the motor using the cumulative value as a battery-protection value, and stop the motor in response to the battery-protection value having exceeded a stop threshold, which is smaller than the protection threshold.

23. The electric work machine according to claim 22, wherein:
the stop threshold includes a first stop threshold and a second stop threshold, which is greater than the first stop threshold; and
the control part is configured, after having stopped the motor in response to the battery-protection value having exceeded the first stop threshold, to restart the motor in response to the manipulatable part being manipulated and, after having stopped the motor in response to the battery-protection value having exceeded the second stop threshold, to prohibit restarting of the motor until the battery-protection value falls below the first stop threshold.

24. The electric work machine according to claim 1, wherein:
the state information further includes map information that indicates a correspondence relationship between the values of the discharge current that flows from the battery pack to the motor and the addition values; and
the control part is configured to detect the discharge-current values and to set the limit threshold based on the detected discharge-current values and the acquired map information.

25. The electric work machine according to claim 24, wherein:
the state information includes a battery temperature of the battery pack and map information differentiated by battery temperature; and
the control part sets the limit threshold based on the detected discharge-current values, the acquired battery temperature, and the acquired map information.

* * * * *